(12) United States Patent
Wada et al.

(10) Patent No.: US 7,228,064 B2
(45) Date of Patent: Jun. 5, 2007

(54) IMAGE DECODING APPARATUS, RECORDING MEDIUM WHICH COMPUTER CAN READ FROM, AND PROGRAM WHICH COMPUTER CAN READ

(75) Inventors: Yoshiyuki Wada, Neyagawa (JP); Makoto Hirai, Suita (JP); Tokuzo Kiyohara, Osaka (JP); Kosuke Yoshioka, Daito (JP); Hideshi Nishida, Nishinomiya (JP); Yukiharu Ieda, Nagoya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1155 days.

(21) Appl. No.: 10/211,716

(22) Filed: Aug. 2, 2002

(65) Prior Publication Data

US 2003/0026487 A1 Feb. 6, 2003

(30) Foreign Application Priority Data

Aug. 2, 2001 (JP) ............................. 2001-235619

(51) Int. Cl.
*H04N 7/26* (2006.01)
*H03N 7/40* (2006.01)

(52) U.S. Cl. ...................... 386/109; 386/124; 386/111; 341/67

(58) Field of Classification Search ................. 341/67; 386/111, 33, 124, 6, 7, 8
See application file for complete search history.

(56) References Cited

U.S. PATENT DOCUMENTS

| | | | | |
|---|---|---|---|---|
| 5,212,742 A | * | 5/1993 | Normile et al. | 382/166 |
| 5,341,250 A | * | 8/1994 | Uchida et al. | 360/48 |
| 5,940,017 A | * | 8/1999 | Jeon | 341/67 |
| 6,041,162 A | * | 3/2000 | Choi | 386/124 |

* cited by examiner

*Primary Examiner*—Thai Q. Tran
*Assistant Examiner*—Hung Dang

(57) ABSTRACT

The present invention provides an image decoding apparatus that realizes speed-up processing of taking out an MR (macroblock remainder) from a fixed length unit that consists of a first DCT block and the MR, without increasing cost. A Setup processor 3 outputs one out of a plurality of fixed length units that constitute an SB (synchronized block). First, calculation is performed for a length from a beginning of the fixed length unit to a EOB (end of block) that is included in the fixed length unit. The calculated length is then used as an offset in taking out the MR. Then an end portion of a second DCT block that is included in the MR is combined with a corresponding beginning portion of the second DCT block, in order to obtain the complete second DCT block. The complete second DCT block is outputted to a variable length code decoder 13.

17 Claims, 22 Drawing Sheets

FIG.5A
Phase1
CASE1 UNIT INCLUDES EOB AT THE END
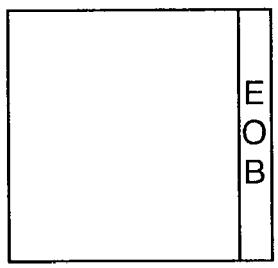
CASE2 UNIT INCLUDES EOB IN THE MIDDLE
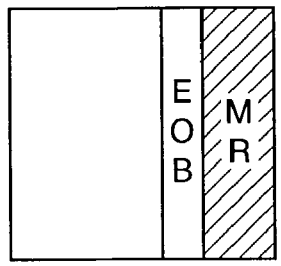
CALCULATE lengh 1
CASE3 UNIT DOES NOT INCLUDE EOB
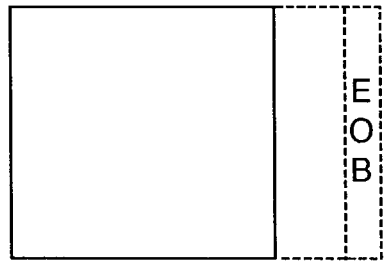
FIG.5B
Phase2
CASE1 MR INCLUDES EOB AT THE END
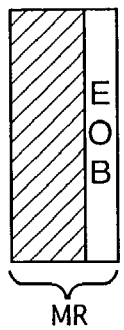
MR
CASE2 MR INCLUDES EOB IN THE MIDDLE
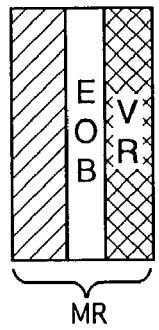
MR
CASE3 MR DOES NOT INCLUDE EOB
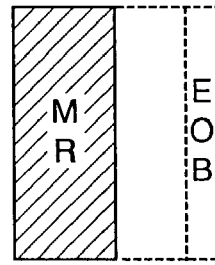
FIG.5C
Phase3
CASE1 VR INCLUDES EOB AT THE END
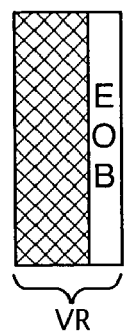
VR
CASE2 VR INCLUDES EOB IN THE MIDDLE
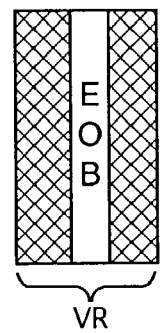
VR
CASE3 VR DOES NOT INCLUDE EOB
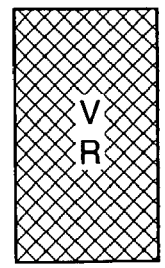

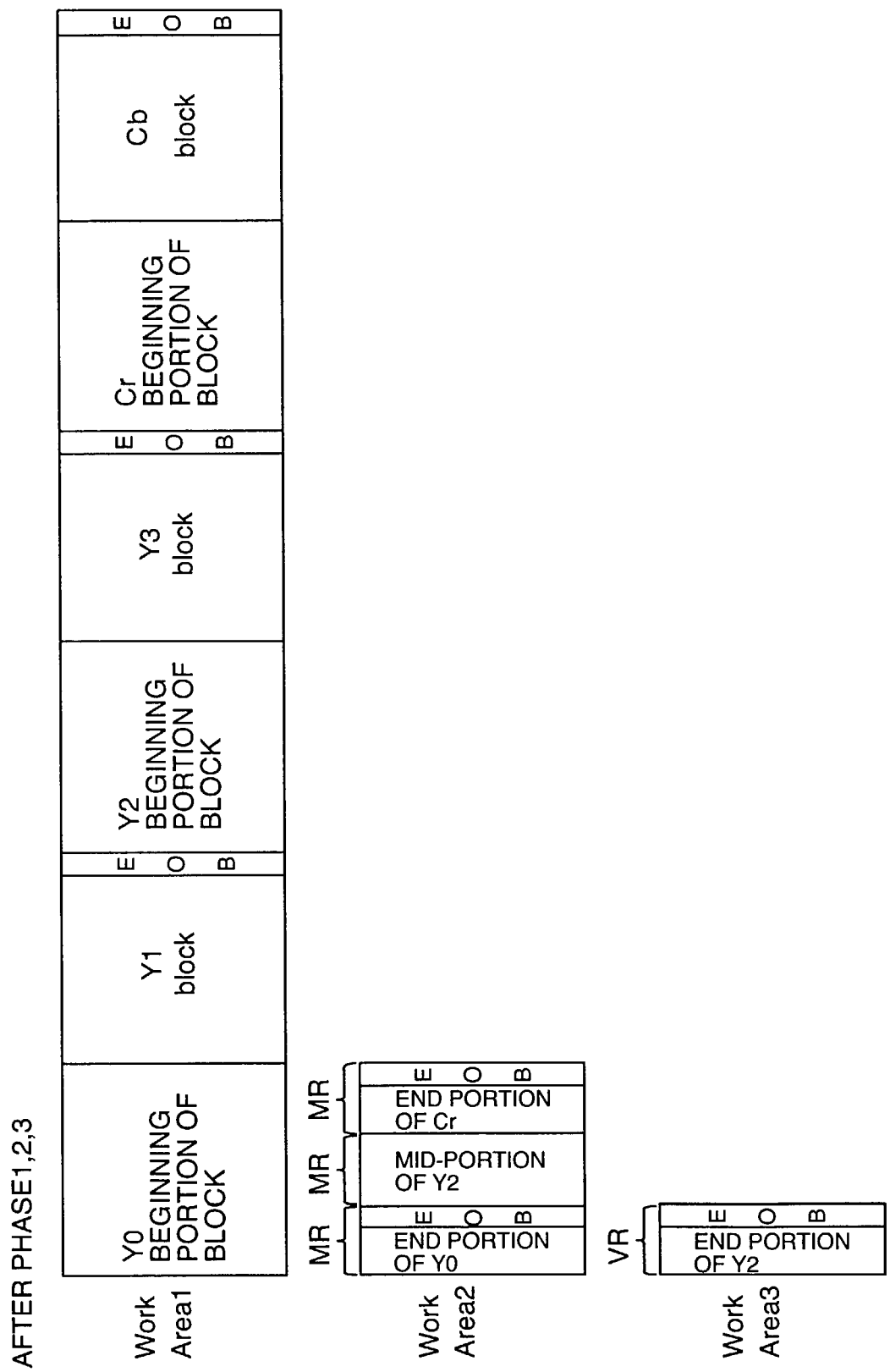

FIG.10

|  | Unit0 | Unit1 | Unit2 | Unit3 | Unit4 | Unit5 |
|---|---|---|---|---|---|---|
| Phase1 | INCOMPLETE | COMPLETE | INCOMPLETE | COMPLETE | INCOMPLETE | COMPLETE |
| Phase2 | COMPLETE | — | INCOMPLETE | — | COMPLETE | — |
| Phase3 | — | — | COMPLETE | — | — | — |

FIG.11
AFTER Re-Arr
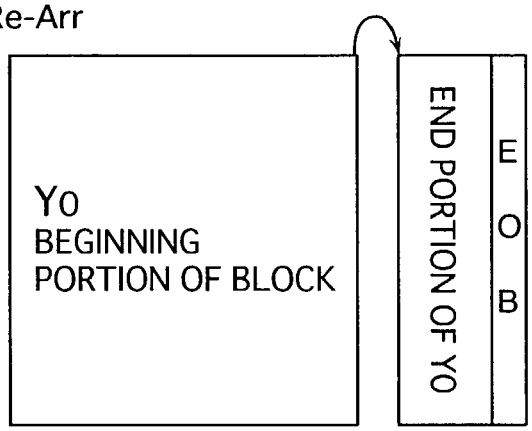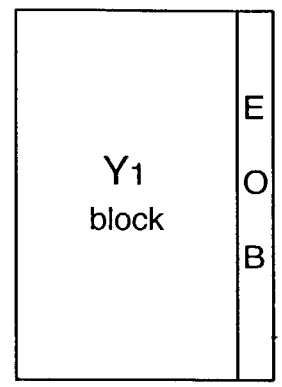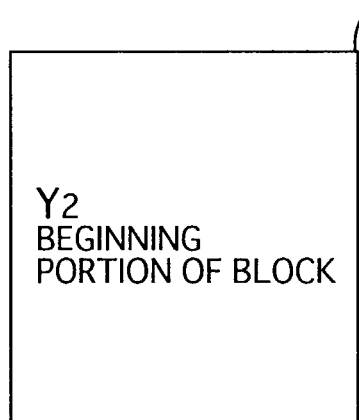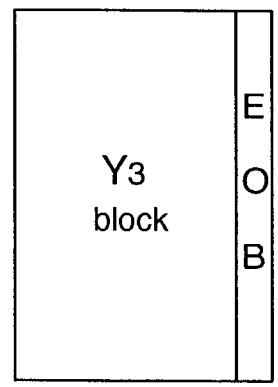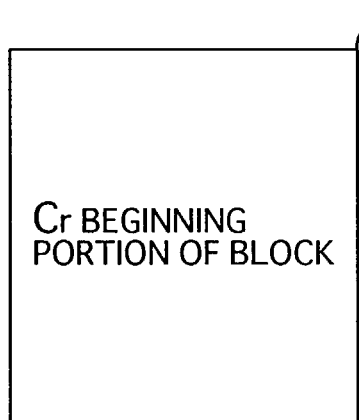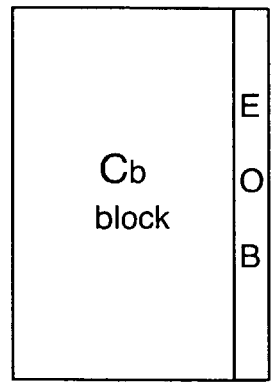

IMAGE DECODING APPARATUS, RECORDING MEDIUM WHICH COMPUTER CAN READ FROM, AND PROGRAM WHICH COMPUTER CAN READ

BACKGROUND OF THE INVENTION

1. Field of the Invention

The present invention relates to an image decoding apparatus for reproducing moving image data that is provided through digital video tape on which the moving image data has been recorded. The present invention further relates to a recording medium which a computer can read from, and to a program which a computer can read. In particular, the present invention relates to a technology for enhancing commonality of circuits between such decoding apparatus for a digital video tape and a decoding apparatus for other media than digital video tape (hereinafter simply referred to as "MPEG decoding apparatus").

2. Description of Background Art

Since the 1990s, digital video tape that can record moving image data thereon (hereinafter "DV tape") has been adopted by a variety of video apparatuses, and is expected to continue being widely used in the video-related area. The format commonly used by DV tape is a digital video (DV) format standardized by the HD digital VTR association. In this DV format, encoding is performed using a hybrid encoding method which is a combination of discrete cosine transform (DCT) encoding and VLC (variable length coding) according to a relation in spatial axis direction. This stands in contrast to motion compensation prediction encoding which is performed according to a relation in time axis direction. The following is a description on how compressed moving image data is written on DV tape. FIG. 1 shows 10 tracks that constitute 1 frame of DV tape. Each track can record 135 number of synchronized blocks as shown in FIG. 1.

FIG. 2 shows an internal structure of a synchronized block. One synchronized block (Sync Block (SB)) has a fixed length of 80 bytes for example, and is divided into 6 fixed-length units. Among the 6 units, 4 fixed-length units each have a length of 14 bites, and each of the other 2 has a length of 10 bytes, for example. These 6 fixed-length units are used to store thereon macroblocks (MB) that have been standardized in accordance with a DV standard or with an MPEG standard. The method of storing MBs into fixed-length units is unique to the DV tape. An MB consists of 6 DCT blocks. There are two kinds of DCT blocks: luminance blocks and chrominance blocks. For example, in FIG. 3, the blocks named Y0, Y1, Y2, and Y3 are the luminance blocks, and the blocks named Cr and Cb are chrominance blocks. Hereinafter in this description, the term "compressed image data" or "variable length data" refers to a DCT block, each DCT block being used as a minimum unit in the operations. The blocks Y0-Cb are not only different in data length from the fixed-length unit, but also are different in data length from each other. Therefore, when storing these DCT blocks into the fixed-length units, it becomes necessary to perform preprocessing depending on the 3 possible patterns. The 3 patterns are (i) in which a fixed-length unit is larger in size than a DCT block, therefore an unused area will arise in the fixed-length unit, (ii) in which a DCT block is larger in size than a fixed-length unit, therefore a remaining part will arise for the DCT block, and (iii) in which a DCT block is the same size as a fixed-length unit. For the DV tape, when a DCT block does not fit into a fixed-length unit, arrangement is made so that the remaining part of the DCT block will be stored in an unused area of another fixed-length unit. Actual recording of DCT blocks on the DV tape is performed after such preprocessing has been done. This preprocessing assures to store each MB in a plurality of SBs, even if the data length is different for each DCT block. This enables to supply MBs to a reproduction apparatus for DV tape at a fixed rate in accordance with the rolling speed of DV tape.

Next, a conventional image decoding apparatus is described. A big difference between MPEG decoding apparatuses and image decoding apparatuses for decoding moving image data recorded on DV tape (hereafter "DV decoding apparatus") is that DV decoding apparatuses performs reformatting processing. The central operation in this reformatting processing is to take out a remaining part from a fixed-length unit in which a DCT block and the remaining part of another DCT part have been stored, for example. In identifying the remaining part to be cut out, the DV decoding apparatus has to search for a boundary between the DCT block and another DCT block, both blocks being stored in one fixed-length unit. This boundary is identified by the code called "EOB (end of block)". EOB is a code which shows that it is the end of a DCT block. In reformatting processing, an operation to search for EOB has to be done for each fixed-length unit. Although a load to be carried for one search is not much, this search has to be executed for each of an enormous number of MBs constituting a moving image, which will end up with quite a load. In order to enhance the speed of this reformatting processing, DV decoding apparatuses are equipped with a memory for storing a plurality of SBs, a dedicated circuit for executing the above-mentioned search operation, and the like.

However, the fact that a DV decoding apparatus has to have such dedicated circuit for reformatting processing works as an impediment against enhancing a commonality between a MPEG decoding apparatus. That is, moving image data that is provided through a medium such as a DVD, an HD, and a digital broadcast, and the like, is not usually converted into the mentioned format that is used for DV tapes, and thus such moving image need not to be performed reformatting processing. It is not preferable that MPEG decoding apparatuses which mainly decode such moving image data to be equipped with such dedicated circuit since it increases the production cost. However, reformatting processing through software, not using a dedicated circuit, impose a great deal of burden on MPEG decoding apparatuses.

In view of the above problem, producers of video-related apparatus are reluctant to commercialize image decoding apparatuses with decoding functions that can deal with both of the DV tape and the DVD-HD, even if it is the market needs. However, apparatuses such as a video camera that performs recording/reproducing in relation to DV, a drive apparatus that reads MPEG streams from a DVD, and a set top box that receives a digital broadcast are equipped with an IEEE1394 interface, and have achieved commonality of input/output interfaces for moving image data. From a the market point of view, it is a simple question why the development is impossible for an image decoding apparatus that has a decoding function for both the DVD and the HD, considering the fact that the interface-commonality has been already achieved. In light of market demands, its cost aspect is no more a good excuse for producers of video-related apparatuses, and it has become an urgent agenda for the producers to develop such image decoding apparatus.

SUMMARY OF THE INVENTION

The object of the present invention, in view of the above-described problems, is to provide a decoding apparatus, a recording medium that a computer can read from, and a program which a computer can read, that enables speed-enhanced processing without incurring high cost, in taking out a remainder from fixed-length data unit in which one set of compressed data has been stored with a remainder of another set of compressed image data.

The objective of the present invention is achieved by a decoding apparatus that converts a plurality of fixed-length data units to a plurality of variable-length data sets and decodes the plurality of variable-length data sets, the plurality of fixed-length data units constituting a synchronized block of digital tape, the decoding apparatus including: a decoder that performs a processing 1 of judging whether each fixed-length data unit includes an end code that indicates an end of a variable-length data set, and a processing 2 of decoding the plurality of variable-length data sets; and a processor that performs the conversion and has the decoder perform the processing 2, where the conversion includes: a processing (a) of extracting a first variable-length data set, from a fixed-length data unit judged to include an end code at the processing 1; and a processing (b) of combining a remainder of the fixed-length data unit with another fixed-length data unit which does not include an end code, in order to reconstitute a second variable-length data set.

According to the above construction, the decoder that decodes variable length data for the decoding apparatus is hardware normally equipped with a standard MPEG decoding apparatus. The present invention makes the decoding apparatus to use this decoder for judging whether an end code exists in each fixed-length data unit. Therefore, the decoding apparatus is able to perform high-speed conversion of fixed-length data units into variable length data sets, without requiring a dedicated circuit for reformatting processing. Making the decoder to perform a conversion in addition to its original function of decoding helps lowering cost in the production of DV·MPEG decoding apparatuses.

Here, the decoder, for the fixed-length data unit that includes the end code, may calculate an offset from a beginning of the fixed-length data unit to the end code, and a length of the first variable-length data set that the processor extracts by the processing (a) may coincide with the offset.

According to the above construction, the decoder is also used for calculating the offset from the beginning of a fixed-length data unit to an end code, as well as being regularly used as decoding variable length data. This realizes speed-up processing of taking out a part of compressed image data from the fixed-length unit, without requiring a dedicated circuit for reformatting processing.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 5A shows Phase 1 having three cases: case 1 in which "unit=DCT block" is held; case 2 in which a whole piece of variable length data is included in a unit, with its EOB in the middle of the unit; and case 3 in which a piece of variable length data is not complete within a unit;

FIG. 5B shows Phase 2 having three cases: case 1 in which "MR=end portion of DCT block" is held with EOB at the end of the MR; case 2 in which EOB exists in the middle of MR, and a whole DCT block is included in the MR; and case 3 in which an MR does not include EOB, and so the MR does not coincides with the end portion of the DCT block;

FIG. 5C shows Phase 3 having three cases: case 1 in which EOB exists at the end of VR; case 2 in which EOB exists in the middle of VR; and case 3 in which EOB does not exist in VR;

FIG. 9 shows contents stored in WorkArea 1, WorkArea 2, and WorkArea 3 respectively, after all of Phase 1, Phase 2, Phase 3 have been completed;

FIG. 10 shows an example of an analysis history table 10 for one SB;

FIG. 11 shows a condition after re-Arr has been performed for all of WorkArea 1, WorkArea 2, and WorkArea 3;

DESCRIPTION OF THE PREFERRED EMBODIMENTS

First Embodiment

Figure 3:
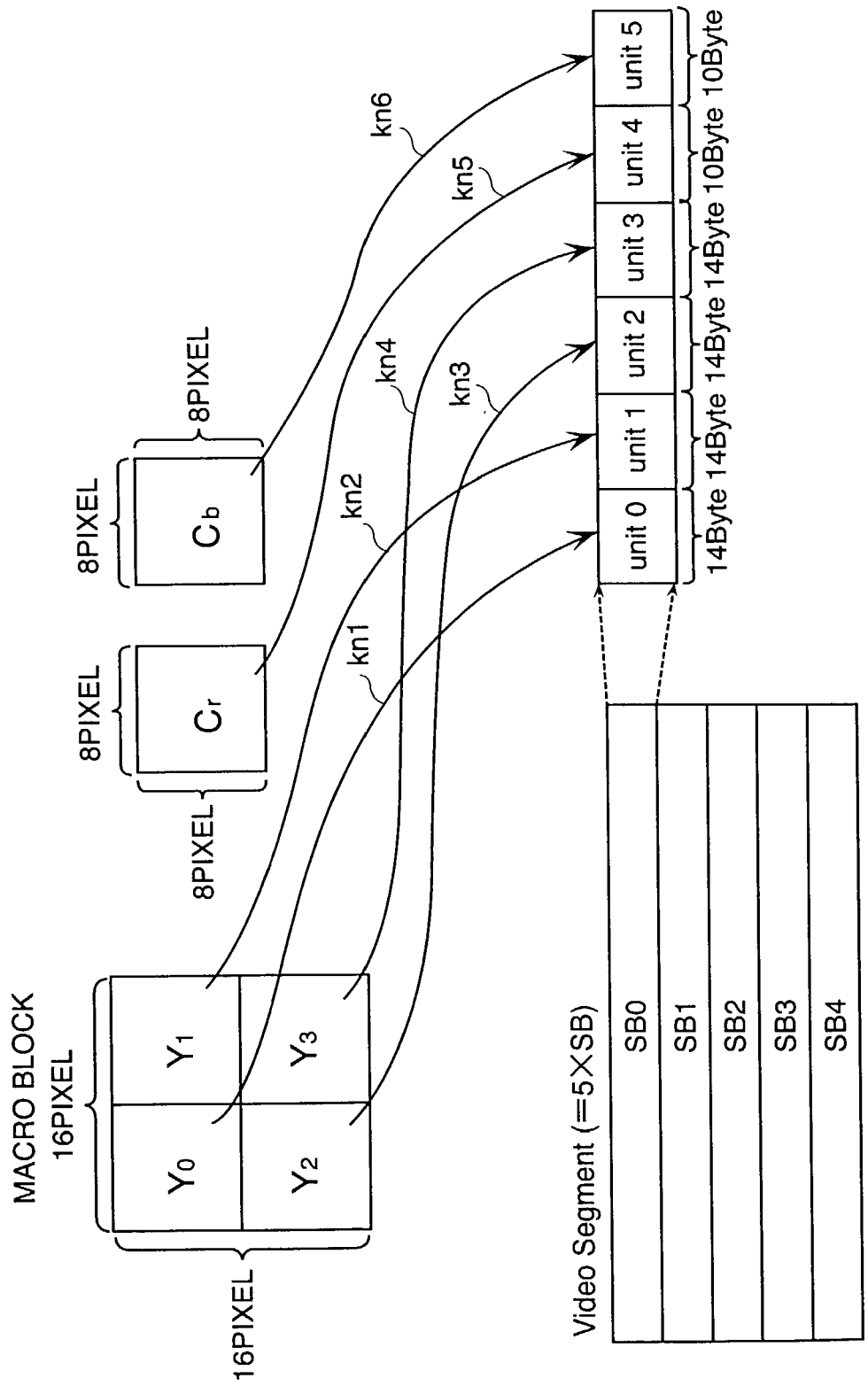
FIG. 3 is a diagram showing how DCT blocks constituting an MB are stored in 5 SB constituting a VS.

The preferred embodiments of the image decoding apparatus will be described in the following. Before the description, more detailed description of a structure of SB in the DV tape will be done as a follow-up to the background art in the above. Each track in the DV tape includes 27 video segments (VS). 1 VS is made up of 5 SBs. FIG. 3 shows the manner in which DCT blocks constituting a MB are stored in SBs. Each SB is composed of 6 fixed-length units (hereinafter simply "unit"). In a unit, blocks named Y0, Y1, Y2, Y3, Cr, and Cb that constitute a MB will be stored, as respective arrows kn1, kn2, kn3, kn4, kn5, and kn6 show. Each DCT block is variable length data, and each of Y0-Y3 includes a DCT factor which indicates luminance of a pixel of 8×8, Cr includes a DCT factor indicating red chrominance of a pixel of 8×8, and Cb includes a DCT factor indicating blue chrominance of a pixel of 8×8.

Figure 4:
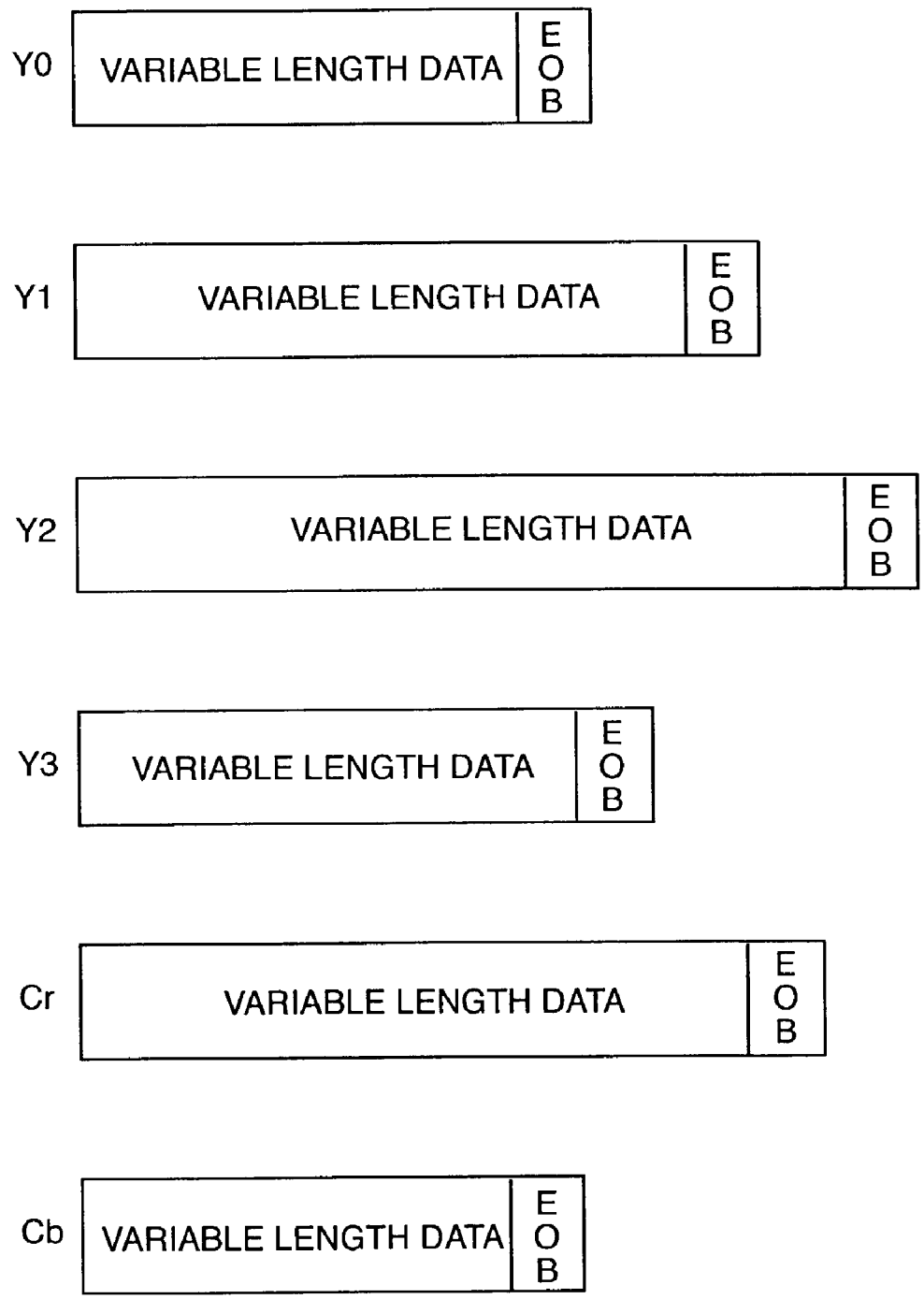
FIG. 4 is a diagram contrasting a length of each DCT block.

An MB is a continuity of DCT blocks, and DCT blocks are separated from each other by EOBs. FIG. 4 shows a length of each DCT block for a contrasting purpose. The reason why the length is different for each DCT block is that a zero run length of a DCT factor is different for each DCT block. Since each DCT block is variable length data that has different length from each other, attempt to store them into fixed-length units results in the cases as shown in FIG. 5A. FIG. 5A shows Case 1 in which "length of a unit=length of a DCT block" is satisfied and an EOB is placed at the end of the unit, Case 2 in which a unit includes a DCT block and that an EOB is placed in the middle of the unit, and Case 3 in which a DCT block is not complete in a unit and that an EOB does not exist in the unit. From the units in Case 1 and Case 2, a complete DCT block can be retrieved. On the other hand, only a first part of the DCT block can be retrieved from the unit of Case 3. The latter part of the DCT block has been stored in a macroblock remainder (MR). The MR signifies the whole latter portion of the unit that succeeds the first portion of the DCT block in Case 2. There are 3 cases of MR as shown in FIG. 5B. In Case 1, a relation "unit=DCT block" is held and EOB exists at the end of MR. In Case 2, MR includes a whole DCT block, and EOB exists in the middle of MR. In Case 3, a DCT block is not complete inside MR and EOB does not exist within MR. In Cases 1 and 2, the end portion of the DCT block can be taken out, while in Case 3, the DCT block can only be taken out up to a midpoint, and the end portion of the DCT block is stored in a video segment remainder (VR). The VR represents a whole latter portion succeeding the EOB of the DCT block within the MR in Case 2. FIG. 5C shows three cases of VR. FIG. 5C has case 1 in which VR has EOB at its end, case 2 in which VR has EOB in the middle, and case 3 in which VR does not include EOB. Case 3 shows a condition in which not a whole portion of a DCT block can be stored in SB, and has been cut off. In case 3, the DCT block is not complete when stored, and requires to be added an EOB in decoding.

Figure 6:
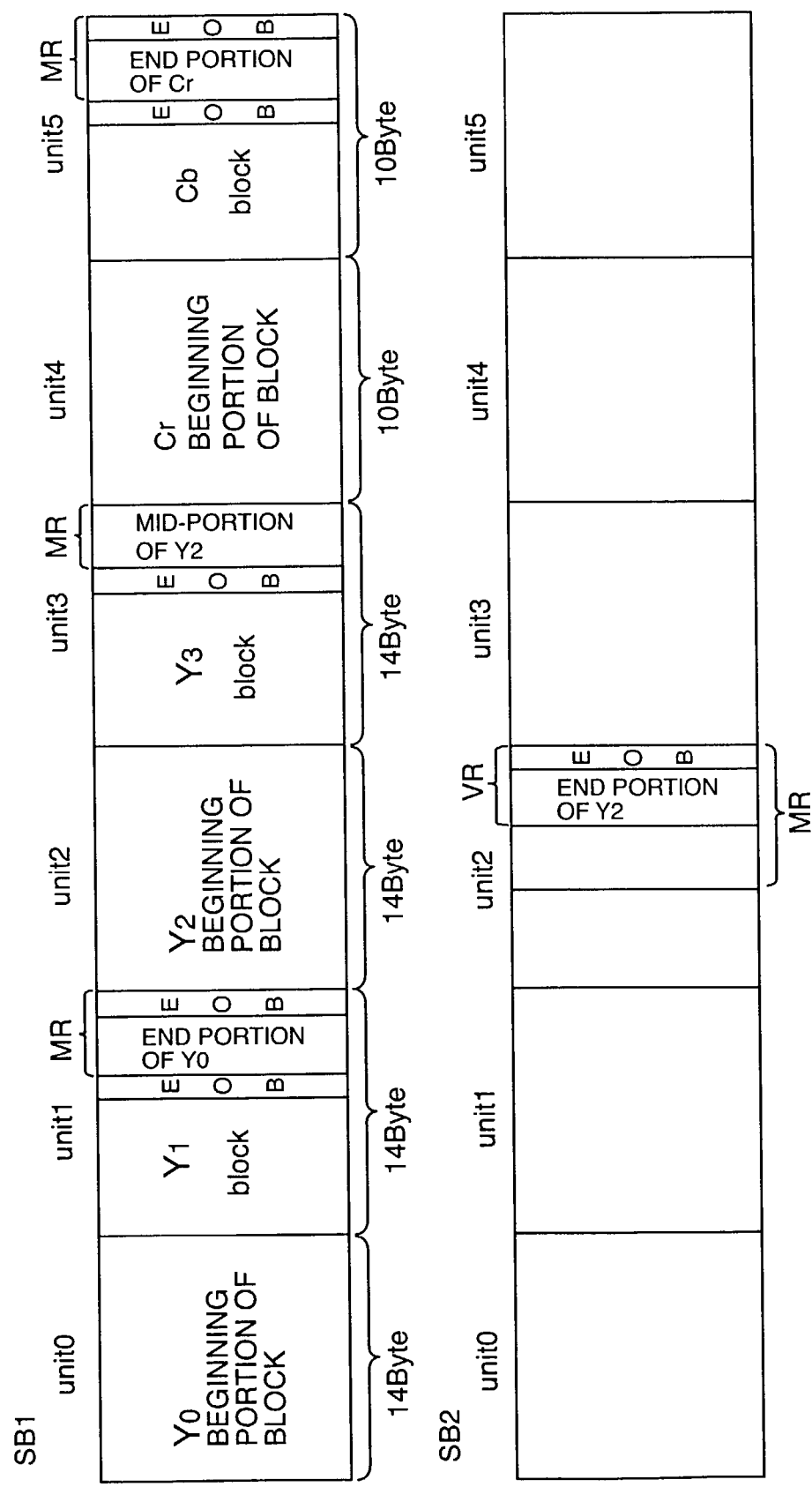
FIG. 6 shows an example of units storing thereon DCT blocks.

A specific example of units in which DCT blocks have been stored is shown in FIG. 6. In SB 1 of FIG. 6, unit 0, unit 2, and unit 4 are respectively filled with blocks named Y0, Y2, and Cr. Unit 1, unit 3, and unit 5 store the whole blocks of Y1, Y3, and Cb respectively, plus an MR. Each of the MRs included in unit 1, unit 3, and unit 5 has the end portion of Y0, the middle portion of Y2, and the end portion of Cr, respectively. On the other hand, VR included in unit 2 of SB 2 stores the end portion of Y2 whose beginning portion is stored in SB 1.

Figure 7:
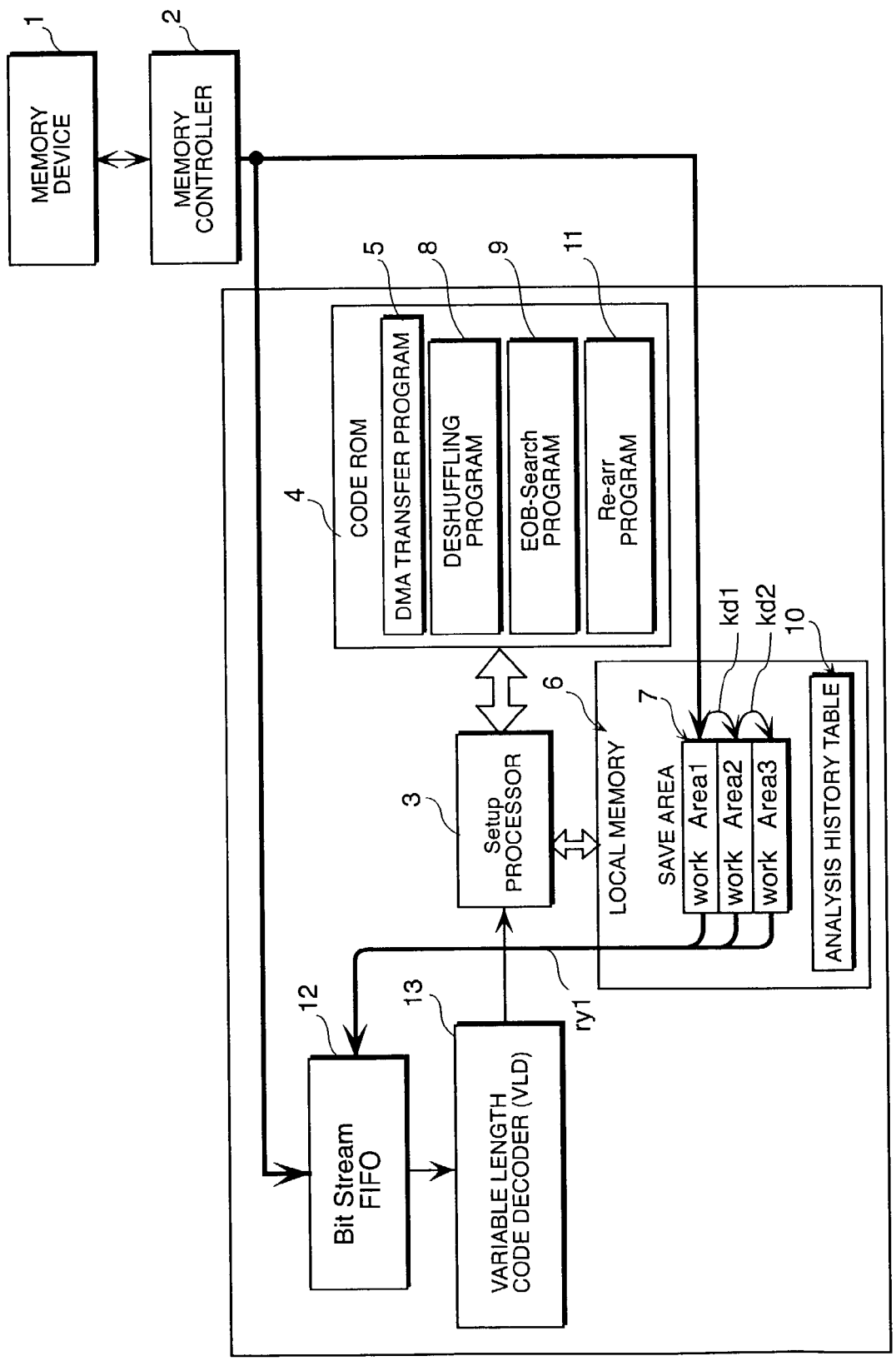
FIG. 7 shows an internal structure of the image decoding apparatus relating to the first embodiment of the present invention.

This is the end of description about MB in SB. Next, an internal structure of the image decoding apparatus is described. FIG. 7 is shows an internal structure of the image decoding apparatus relating to the first embodiment of the present invention. As shown in FIG. 7, the image decoding apparatus includes a memory device 1, a memory controller 2, a setup processor 3, code ROM 4, a DMA transfer program 5, a local memory 6, a save area 7, a deshuffling program 8, an EOB-Search program 9, an analysis history table 10, a rearrangement (Re-arr) program 11, a BitStream FIFO 12, a variable length code decoder 13, and so on, and is employed being connected to an input apparatus which is not shown in the figure. The mentioned input apparatus is a VTR recorder for DV tape, and outputs moving image data which has been converted in VS to the image decoding apparatus.

The memory device 1 is a memory to store 27 number of VSs read from one track of DV tape.

The memory controller 2 is a controller for realizing memory access to the memory device 1.

The Setup processor 3 is a general-purpose DSP (i.e. signal processor) that operates according to various types of programs stored in the code ROM 4.

The code ROM 4 is ROM that stores the various types of programs that the Setup processor 3 is to execute. Included in the programs are the DMA transfer program 5, the deshuffling program 8, the EOB-Search program 9, the Re-arr program 11, and the like.

The DMA transfer program 5 is a program that makes the Setup processor 3 to execute a DMA transfer. The mentioned DMA transfer is to transfer a VS from the memory device 1 to the BitStream FIFO 12, or from the memory device 1 to the save area 7 inside the local memory 6.

The local memory 6 is a necessary memory for the Setup processor 3 to execute processing, and includes the save area 7 for storing VSs transferred from the DMA transfer program 5, as well as storing the analysis history table 10.

The save area 7 includes WorkArea 1, WorkArea 2, and WorkArea 3. The WorkArea 1 is an area for storing VS being transferred from the memory device 1. The WorkArea 2 is an area for storing MR included in each unit of VS being stored in the WorkArea 1. The WorkArea 3 is an area for storing VR included in the MR stored in the WorkArea 2.

The deshuffling program 8 is a program that makes the Setup processor 3 to execute deshuffling. Deshuffling is a processing for returning units, to their original position, that has been stored inside VS in the WorkArea of the local memory 6.

Figure 8A:
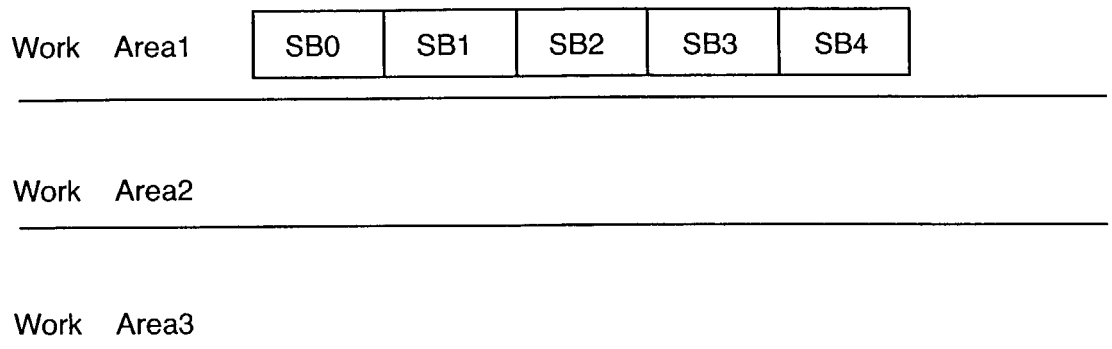
FIG. 8A shows contents stored on a local memory before the Setup processor 3 performs DMA transfer.
Figure 8B:
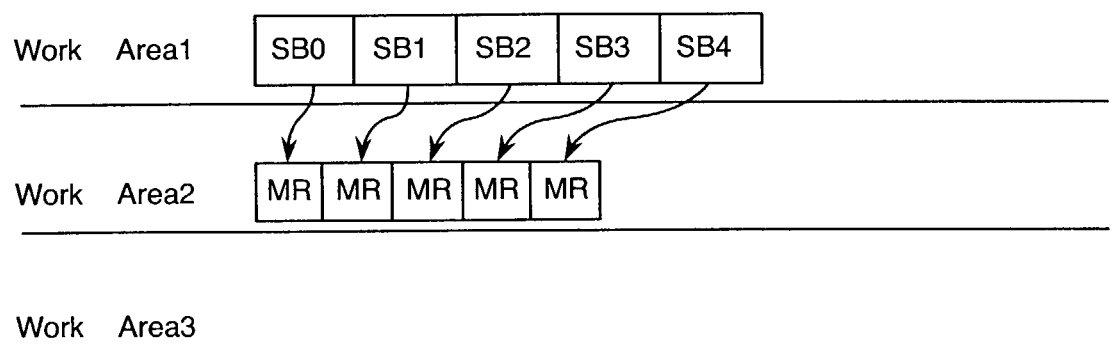
FIG. 8B shows contents stored on a local memory after Phase 2.
Figure 8C:
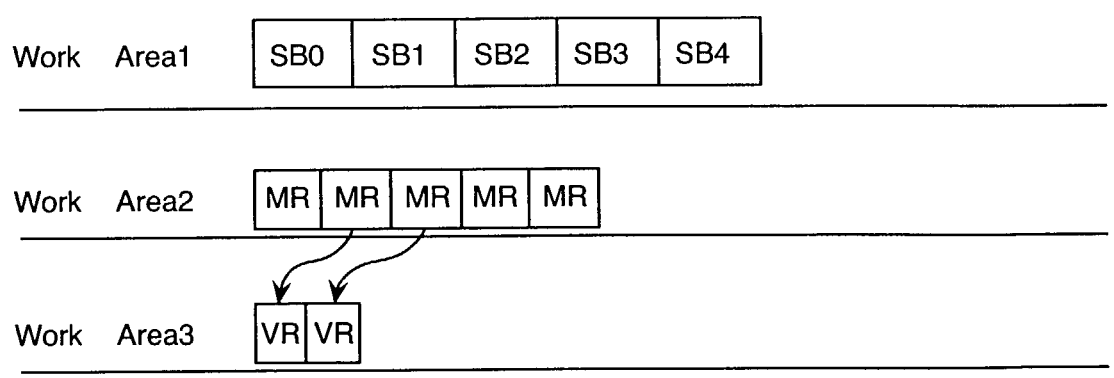
FIG. 8C shows contents stored on a local memory after Phase 3.

The EOB-Search program 9 is a program for making the Setup processor 3 to execute EOB_search. The EOB_search comprises of Phase 1 processing, Phase 2 processing and Phase 3 processing. The Phase 1 processing is for taking out MR from each SB unit that constitutes VS in the WorkArea 1 and for writing the MR to the WorkArea 2, as shown by the arrow Kd1 of FIG. 7. The Phase 2 processing is for taking out VR that is included in the MR stored in the WorkArea 2 and for writing the VR in the WorkArea 3, as shown by the arrow kd2. The Phase 3 processing is for judging whether a DCT block is complete/incomplete inside one VR. The Phase 1-3 processing that the EOB-Search program 9 executes change the stored content as shown in FIGS. 8A-8C. FIG. 8A shows content stored in the WorkAreas 1-3 after the DMA transfer has been completed. In FIG. 8A, one out of 27 VSs that has been stored in the memory device 1 is stored in the WorkArea 1. FIG. 8B shows contents stored in the WorkAreas 1-3 after the Phase 1 has been completed. In FIG. 8B, MR in each SB unit has been taken out from the WorkArea 1 to be placed in the WorkArea 2. FIG. 8C shows contents stored in the WorkAreas 1-3 after the Phase 2 has been completed. In FIG. 8C, VR has been taken out from MR in WorkArea 2 and placed in the WorkArea 3. When the EOB-Search program 9 executes the Phase 1-3 processing for the two SBs shown in FIG. 6, content stored in the WorkAreas 1-3 will be as shown in FIG. 9. In this situation, The WorkArea 1 stores the whole blocks of Y1, Y3, and Cb as well as a beginning portion for each of the Y0, Y2, and Cr blocks. In the WorkArea 2, an end portion for each of Y0 and Cr as well as a middle portion of Y2 are stored, all of which having been stored as MR. The WorkArea 3 stores a end portion of the Y2 which has been stored as VR. As such, a plurality of units read from the DV tape will be grouped, on the local memory 6, into MR and VR.

The analysis history table 10 is a table for storing an analysis result in each phase for 5 MBs. FIG. 10 is an example analysis history table for one SB. On this table, a result is written for each of the unit 0-unit 5 as to whether they have been judged to be complete/incomplete in Phase 1, Phase 2, and Phase 3. Consulting this analysis history table 10, it is possible to see at a glance, whether each unit in SB, MR, and VR is complete or incomplete in each phase.

Figure 1:
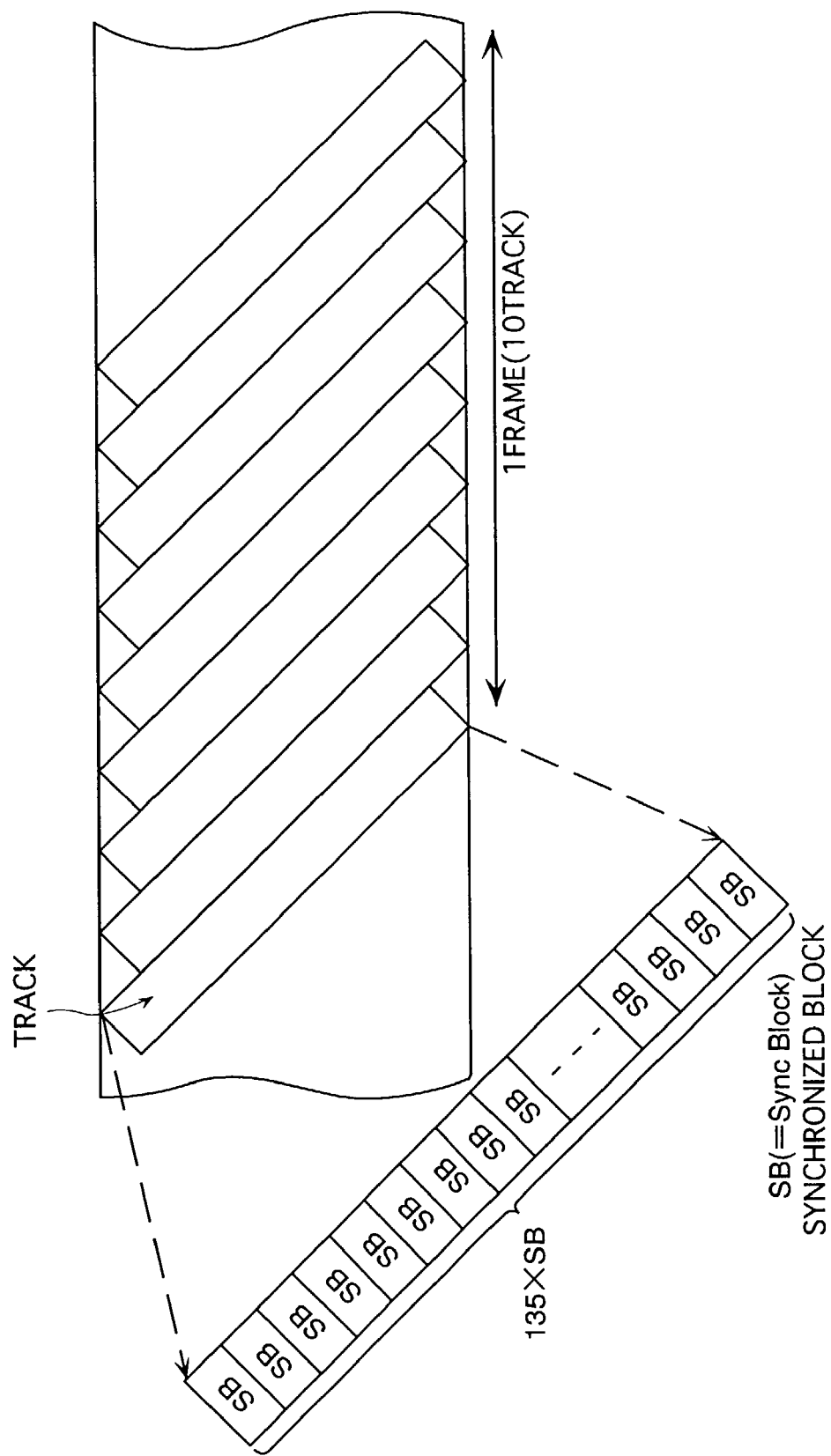
FIG. 1 is a diagram showing 10 tracks that constitute 1 frame of DV tape.
Figure 2:
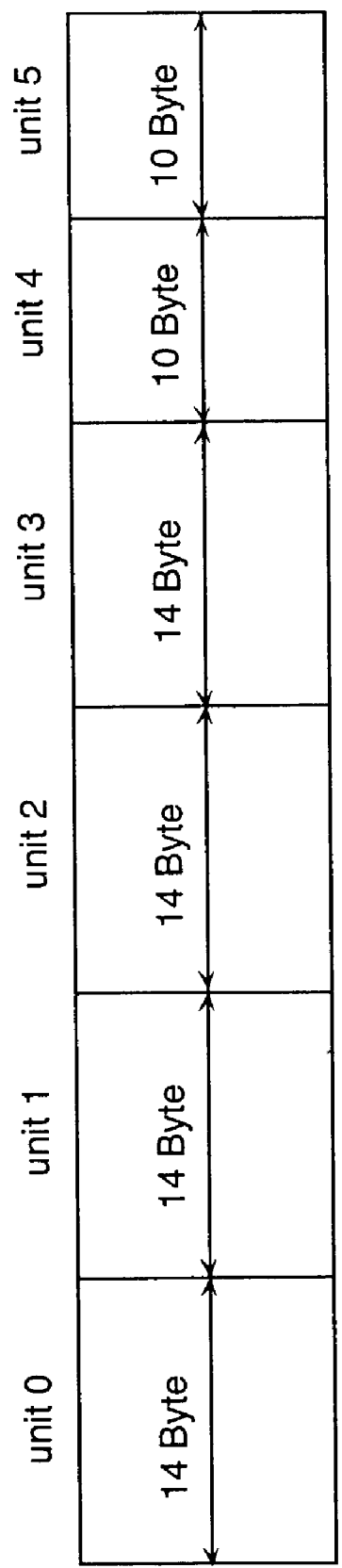
FIG. 2 is a diagram showing an internal structure of SB.

The Re-arr program 11 is a program for making the Setup processor 3 to execute re-Arr. The re-Arr is processing for outputting variable length data stored in the WorkArea 1-3 as one data set, as shown by the arrow ry1 in FIG. 7. In the re-Arr processing, VRs in the WorkArea 3 that include end portions of DCT blocks, MRs in the WorkArea 2 that include end or middle portions of DCT blocks, and beginning portions of DCT blocks included in the units stored in the WorkArea 1 are put together to reconstitute the original DCT blocks. After having undergone the mentioned processes, the reconstituted DCT blocks are outputted to the variable length code decoder 13. To summarize, executing re-Arr for the WorkArea 1-3 in FIG. 9 will reconstitute the DCT blocks of FIG. 1. In the light of one DCT block, the beginning portion of Y0 block stored in the WorkArea 1 is first combined with the end portion of the Y0 block stored in the WorkArea 2, and then outputted to the variable length code decoder 13. Likewise, the beginning portion of the Y2 block stored in the WorkArea 1 is combined with the corresponding middle portion in the WorkArea 2 and with the corresponding end portion in the WorkArea 3, then outputted to the variable length code decoder 13.

The BitStream FIFO 12 is to temporarily store DCT blocks outputted as a result of re-Arr of the Re-arr program 11, and to output the DCT blocks to the variable length code decoder 13 on a first-in first-out basis.

The variable length code decoder 13 is a dedicated circuit for performing variable length code decoding (VLD) for the variable length data that is outputted via the BitStream FIFO 12. Before executing VLD, the variable length code decoder 13 judges whether EOB exists or not, and whether a DCT block has been complete. And when it is judged that the DCT block is complete, a length of the DCT block is calculated. After having finished the above series of preprocessing, the VLD will be performed. When a DCT block is outputted from the BitStream FIFO 12, VLD is performed for this DCT block without performing the above mentioned preprocessing.

A characteristic of the image decoding apparatus as structured in the above is that the portion of the MR and VS to be taken out are defined based on the length from the beginning of unit to the EOB, from the beginning of MR to the EOB, from the beginning of MR to EOB, and from the beginning of VR to EOB, all of which are to be calculated by the variable length code decoder 13 when executing EOB_Search. The following details the mentioned processing using a flow chart and a timing chart.

Figure 12:
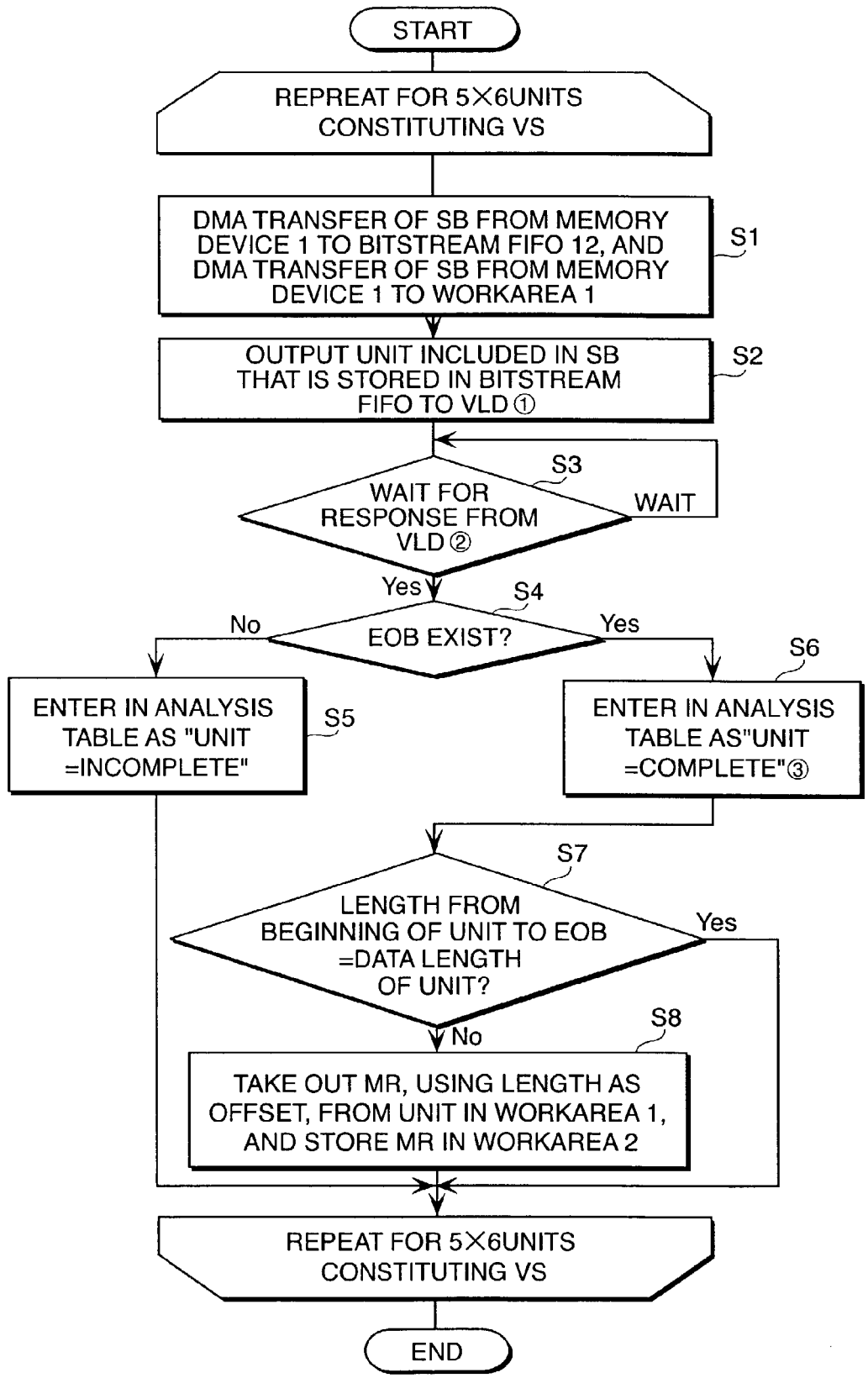
FIG. 12 is a flow chart showing procedure of program in making the Setup processor 3 to execute Phase 1.
Figure 14:
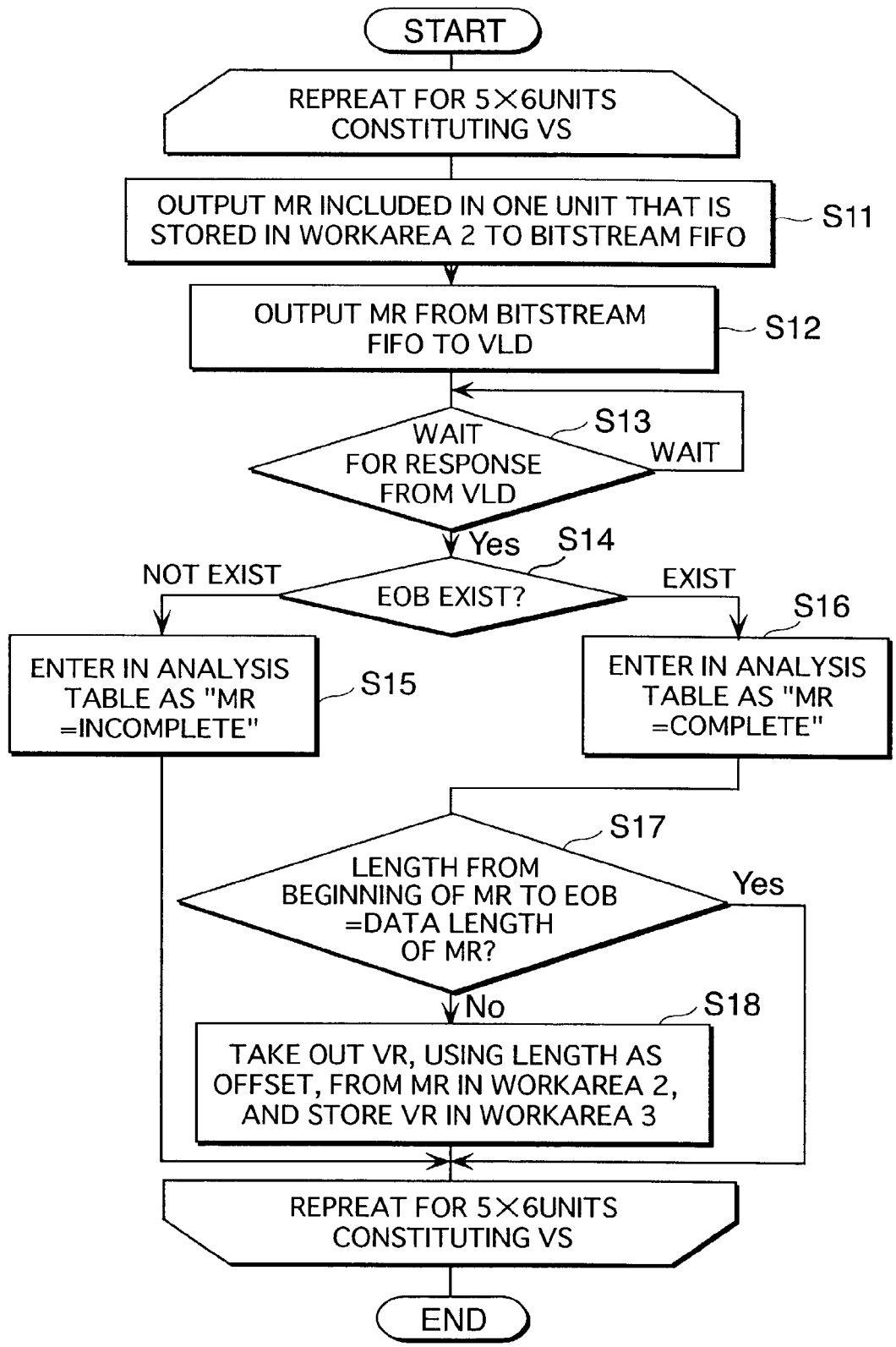
FIG. 14 is a flow chart showing procedure of program in making the Setup processor 3 to execute Phase 2.
Figure 16:
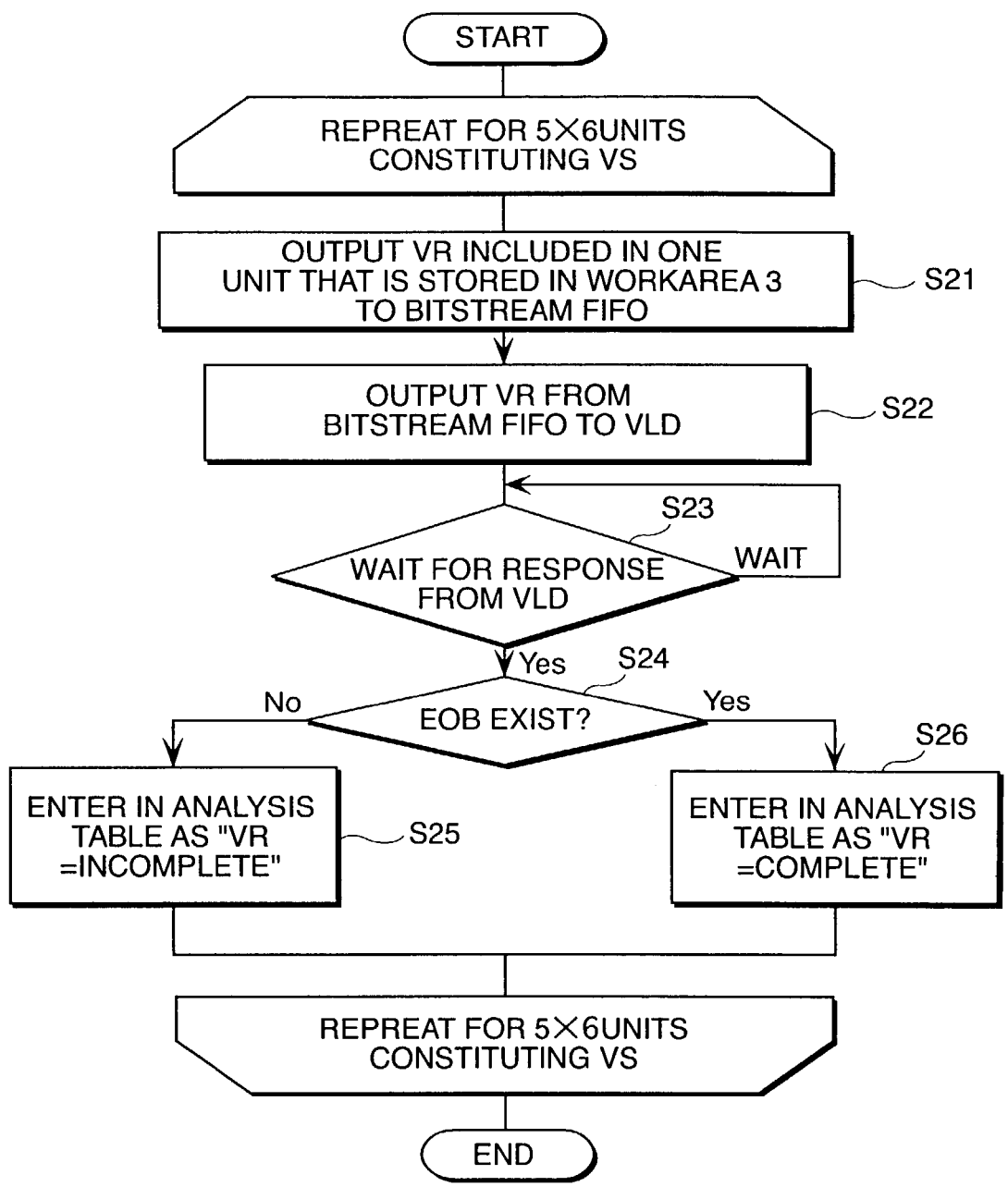
FIG. 16 is a flow chart showing procedure of program in making the Setup processor 3 to execute Phase 3.

The EOB-Search program 9 is a code sequence for realizing the flow charts shown in FIGS. 12, 14, and 16. The sequence will be repeated for each of the 5×6 units that constitute a VS. The following describes the EOB-Search program 9 with reference to the flow charts.

Figure 13:
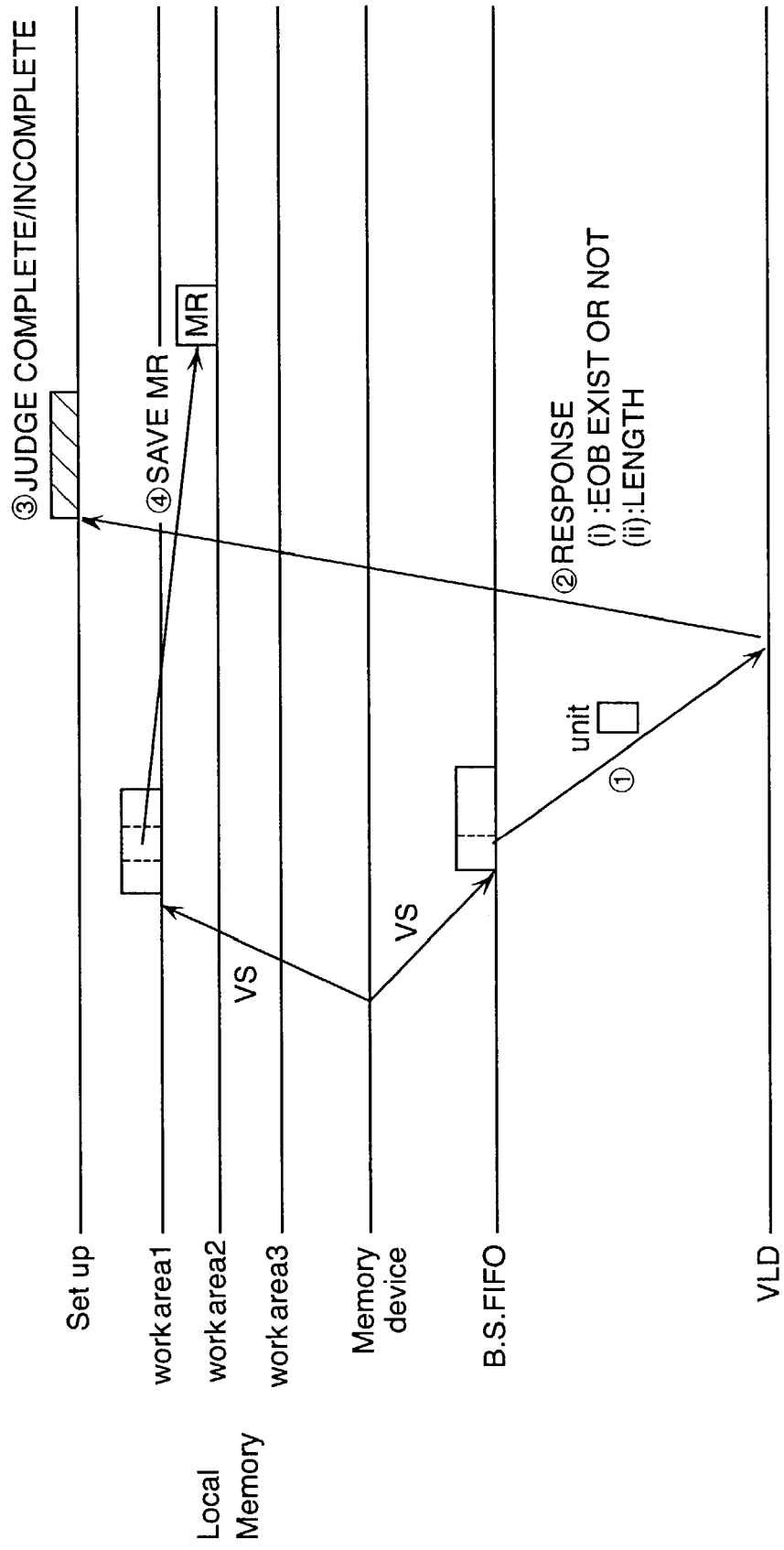
FIG. 13 is a timing chart for the internal working of the DV·MPEG decoding apparatus in Phase 1.

First, the processing in Phase 1 is described. FIG. 12 is a flow chart showing a procedure of the program that makes the Setup processor 3 to execute Phase 1. FIG. 13 is a timing chart relating to the mentioned procedure for Phase 1, and this chart will be also used in the description. At Step S1, DMA transfer of SB is performed from the memory device 1 to the BitStream FIFO 12, then DMA transfer of SB is performed from the memory device 1 to the WorkArea 1. At Step 2, units included in SB stored in the BitStream FIFO 12 are outputted to the variable length decoder 13. As shown in FIG. 13①, once a unit is outputted, the control waits until a response is received from the variable length code decoder 13 (Step S3). Here, suppose a response is outputted, to the Setup processor 3, that includes information on existence of EOB and on a length of the variable length data as shown in FIG. 13②. This results in Yes in Step S3, and the control moves from Step S3 to Step S4. Once the response is notified, the Setup processor 3 performs analysis based on this response, at a timing shown by ③. In the analysis, a judgment is performed as to which case the unit outputted to the VLD applies to among the cases depicted in FIG. 5A. In this analysis, at Step S5, judgment is performed as to whether EOB exists or not inside the unit. If EOB does not exist (Case 3 in FIG. 5A), this indicates that the unit does not include a complete DCT block, and so "incomplete" will be entered for the corresponding unit in Phase 1 in the analysis history table 10.

On the contrary, if EOB exists, this indicates that the unit includes a complete DCT block, and so "complete" will be entered in the analysis history table 10. At Step S7, a judgment is performed as to whether a length from the beginning of the unit to the EOB corresponds to the fixed length of the unit. If both correspond to each other (Case 1), which means that EOB is placed at the end of the unit. In this case, the processing will be finished since this means that the unit does not include MR. If the length does not correspond to the fixed length of the unit (Case 2), this indicates that EOB exists in the middle of the unit. Therefore, the processing at Step S8 will be performed, since MR exists after the EOB within the unit. At Step S8, MR will be taken out from the unit in the WorkArea 1, using the length as an offset. This processing is also shown in the timing chart of FIG. 13 at ④, where MR is taken out from the WorkArea 1, and saved in the WorkArea 2.

Figure 15:
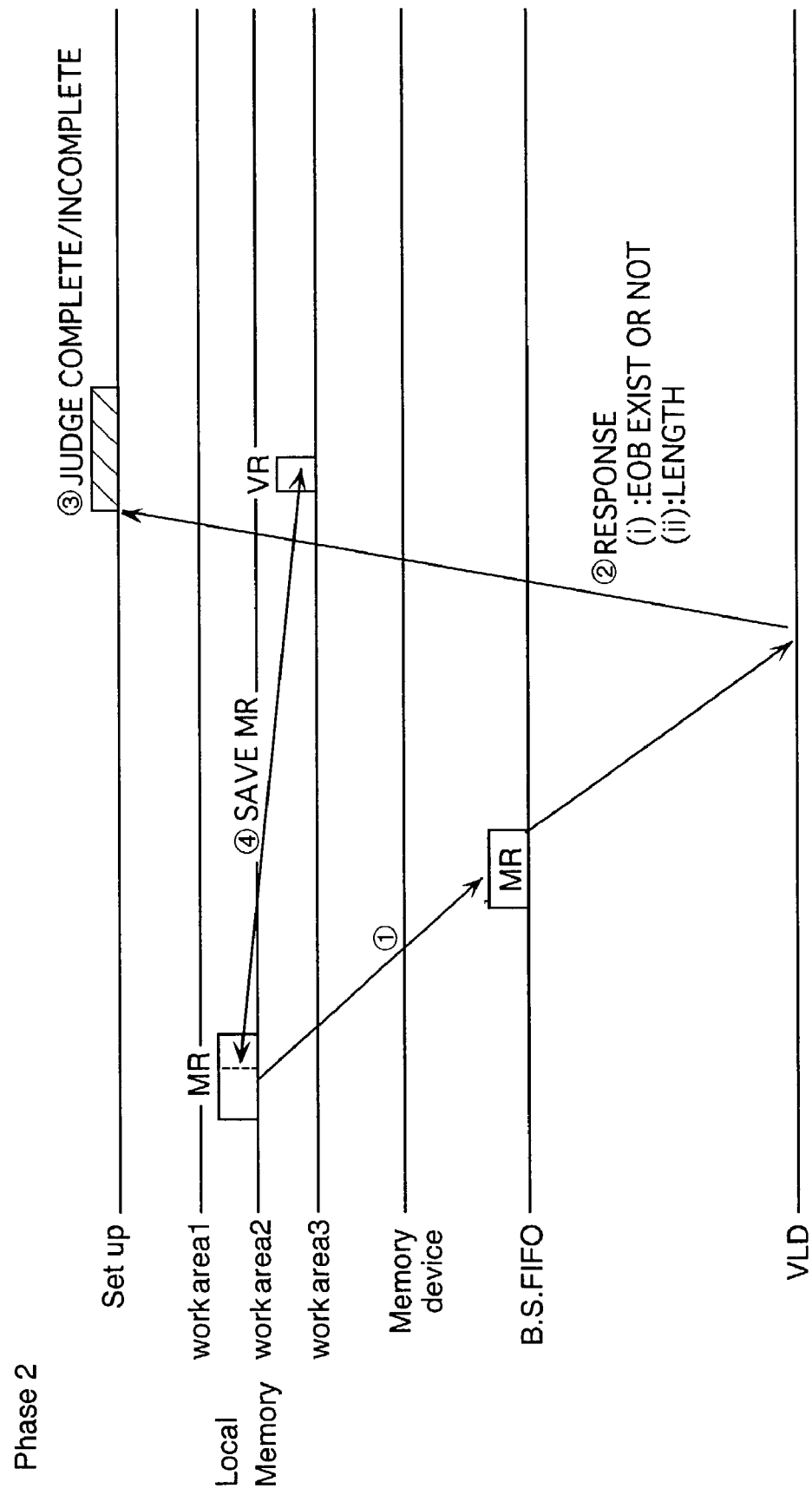
FIG. 15 is a timing chart for the internal working of the DV·MPEG decoding apparatus in Phase 2.

Next, the processing of the Setup processor 3 in Phase 2 is described with reference to the flow chart of FIG. 14, and also to the timing chart of FIG. 15. At Step S11, an MR for one unit is outputted from the WorkArea 2 to the BitStream FIFO 12. Then, the MR will be outputted to the VLD via the BitStream FIFO 12. At Step 12, the MR is outputted from the BitStream FIFO 12 to the variable length code decoder 13, as shown in FIG. 15①. At Step S13, the control waits until a response is received from the variable length code decoder 13. When a response is outputted to the Setup processor 3 as shown in FIG. 15②, the response including information on existence of EOB and on a length of the variable length data, the Setup processor 3 performs an analysis of ③and judges which case among Case 1-3 in FIG. 5B applies to the received MR.

First, at Step S14, it is judged whether EOB exists in the MR. If EOB does not exist in the MR, the fact thereof is entered in the analysis history table 10 at Step S15. That is, "MR=incomplete" (that it is Case 3) is entered in the analysis history table 10. If EOB exists in the MR, "MR=complete" is entered in the analysis history table 10 at Step S16. At Step S17, it is judged which one of Case 1 and Case 2 applies to the MR, by judging whether a length from the beginning of the MR to EOB corresponds to a length of MR. If the both correspond to each other (Case 1), no further processing will be performed. If the both are different from each other (Case 2), this means that the MR includes VR. Therefore, this VR will be taken out at Step S18. Specifically, VR will be taken out from the MR in the WorkArea 2, using the length from the beginning of the MR to EOB as an offset.

Figure 17:
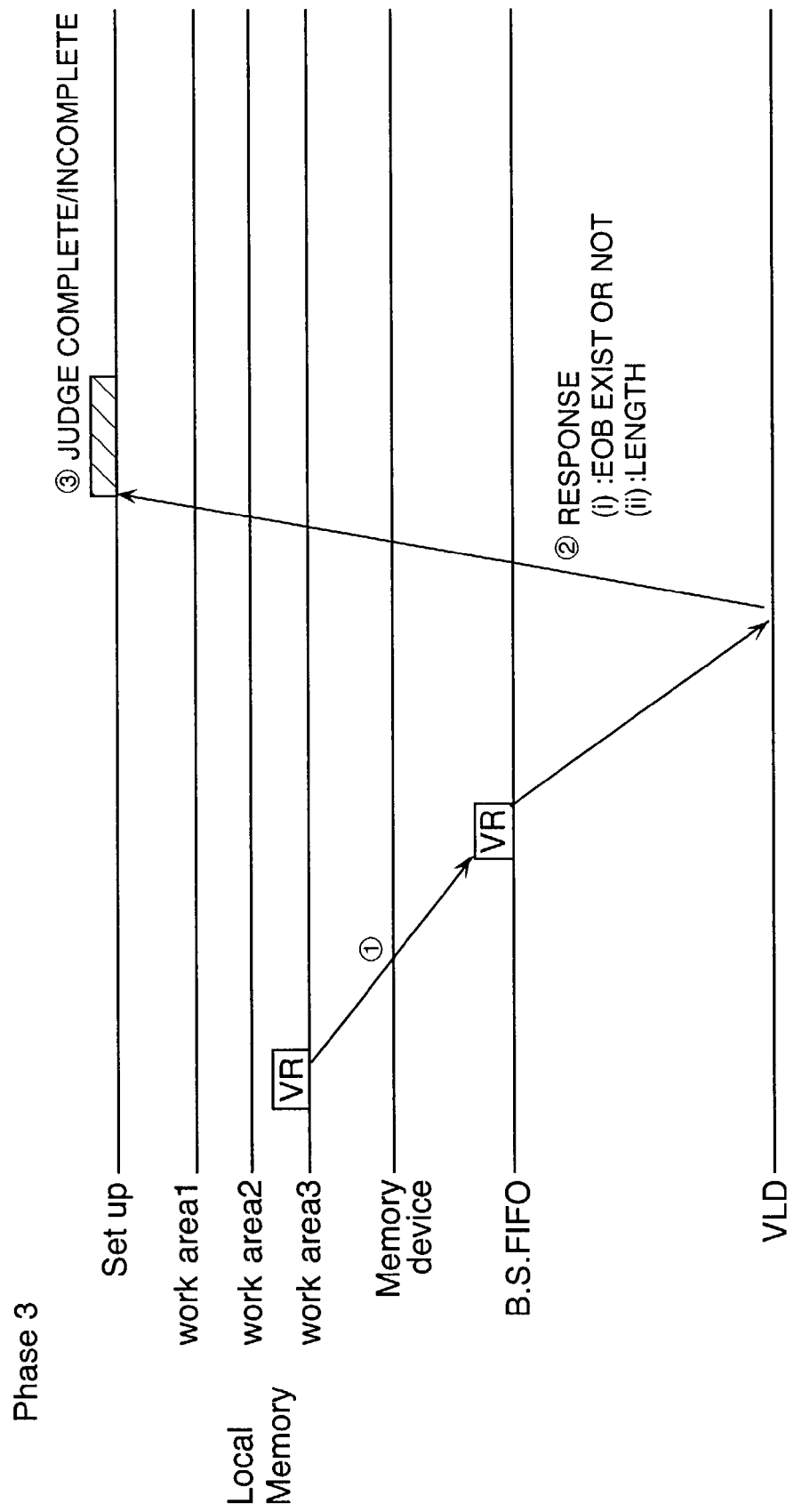
FIG. 17 is a timing chart for the internal working of the DV·MPEG decoding apparatus in Phase 3.

Next, the processing in Phase 3 performed by the Setup processor 3 is described with reference to the flow chart of FIG. 16, and the timing chart of FIG. 17. At Step S21, VR for one unit is outputted from the WorkArea 3 to the BitStream FIFO 12. At Step S22, the VR is outputted from the BitStream FIFO 12 to the variable length code decoder 13. At Step S23, the Setup processor 3 waits until it receives a response from the variable length code decoder 13. As shown in FIG. 17②, when a response is received that includes information on existence of EOB and on a length of variable length data, judgment is performed as to which one of Case 1-3 in FIG. 5C applies to the received VR. At Step S24, judgment is performed whether EOB exists in the VR. If the VR does not include EOB, "VR=incomplete" is entered in the analysis history table 10 at Step S25. If the VR includes EOB, "VR=complete" is entered in the analysis history table 10 at Step S26.

As seen in the above description, the first embodiment of the present invention enables the variable length code decoder 13 to calculate a data length of each DCT block, the entire body of which is stored in the fixed-length unit. It becomes possible, using the data length, to take out each end portion or middle portion of the other DCT blocks that belong to the same MB. The variable length code decoder 13 whose original purpose is to perform VLD is hardware which image decoding apparatuses normally include. Therefore the present embodiment enables to take out remainder of DCT blocks from the fixed-length units at high-speed, without needing a dedicated circuit therefor.

Second Embodiment

Figure 18:
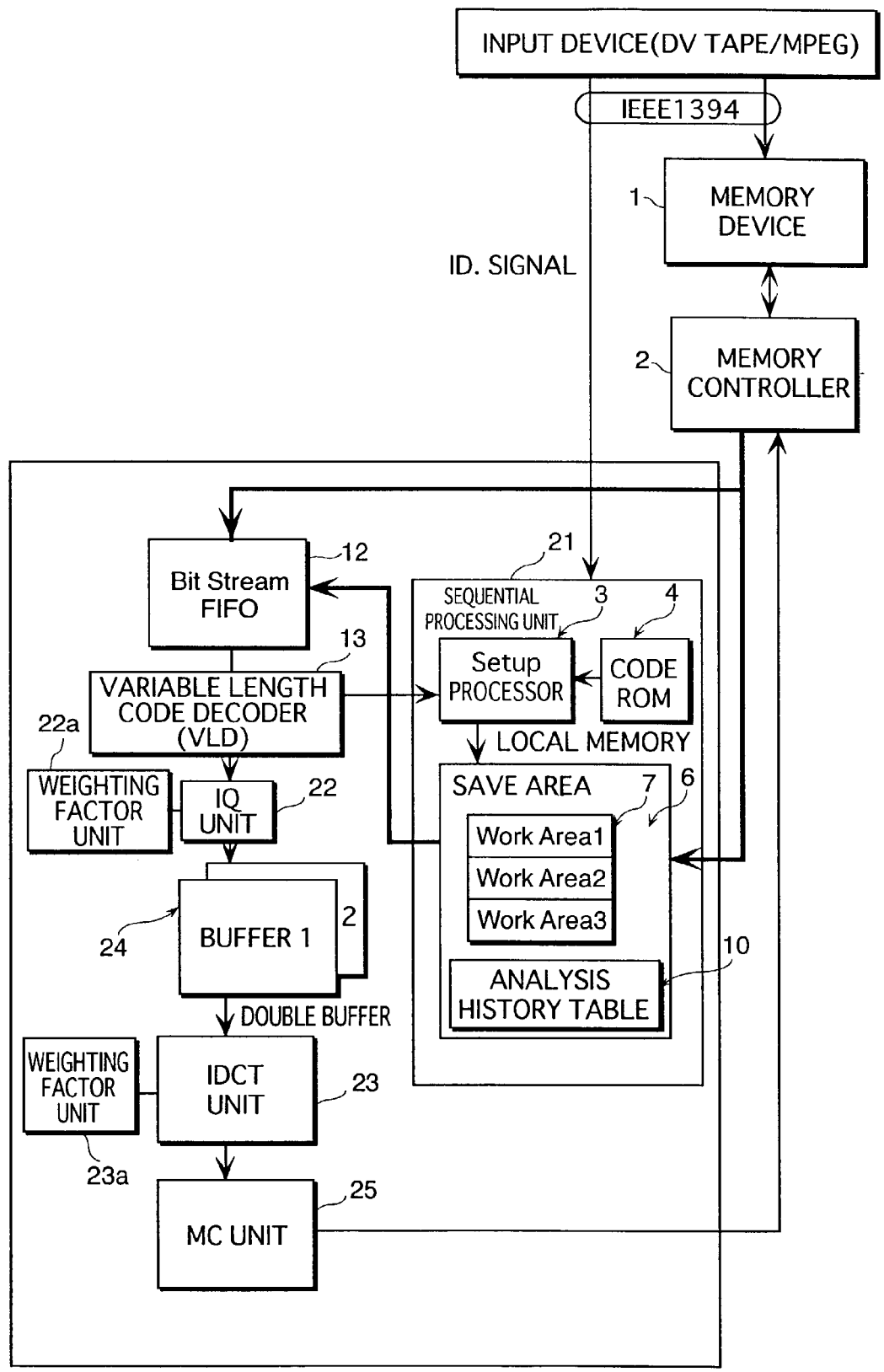
FIG. 18 shows an internal structure of the DV·MPEG decoding apparatus relating to the second embodiment.

The second embodiment of the present invention relates to a DV·MPEG decoding apparatus that functions as a DV decoding apparatus as well as an MPEG decoding apparatus. FIG. 18 shows an internal structure of the DV·MPEG decoding apparatus relating to the second embodiment. In FIG. 18, each constituting element that has a same function as the corresponding element in FIG. 7 of the first embodiment is assigned the same reference number. The other constituting elements in FIG. 18 that do not have a corresponding element in FIG. 7 are assigned reference numbers in twenties, in order to show that they are unique to the second embodiment. The DV·MPEG decoding apparatus in FIG. 18 includes a sequential processing unit 21, a BitStream FIFO 12, a variable length code decoder 13, an inverse quantization (IQ) unit 22, an IDCT unit 23, a double buffer 24, and an MC unit 25, and is used by being connected to an input apparatus. The input apparatus is for DV tape, and is a combination of a reception apparatus, a VTR recorder, a drive apparatus for DVD, a digital television, and the like. The input apparatus is connected to the DV·MPEG decoding apparatus through the IEEE 1394. The input apparatus outputs an ID signal together with moving image data to the DV·MPEG decoding apparatus through the IEEE 1394. The ID signal is a signal for identifying data sent from outside whether it is VS (a set of fixed-length data) which is read from DV tape, or MB (a set of variable length data) which is supplied from a medium other than DV tape such as a recording medium and a broadcasting medium. The ID signal will be sent from the input apparatus, prior to the moving image data. The DV·MPEG decoding apparatus starts performing as a DV decoding apparatus if the ID signal is indicating VS, and as an MPEG decoding apparatus if the ID signal is indicating MB.

Figure 19:
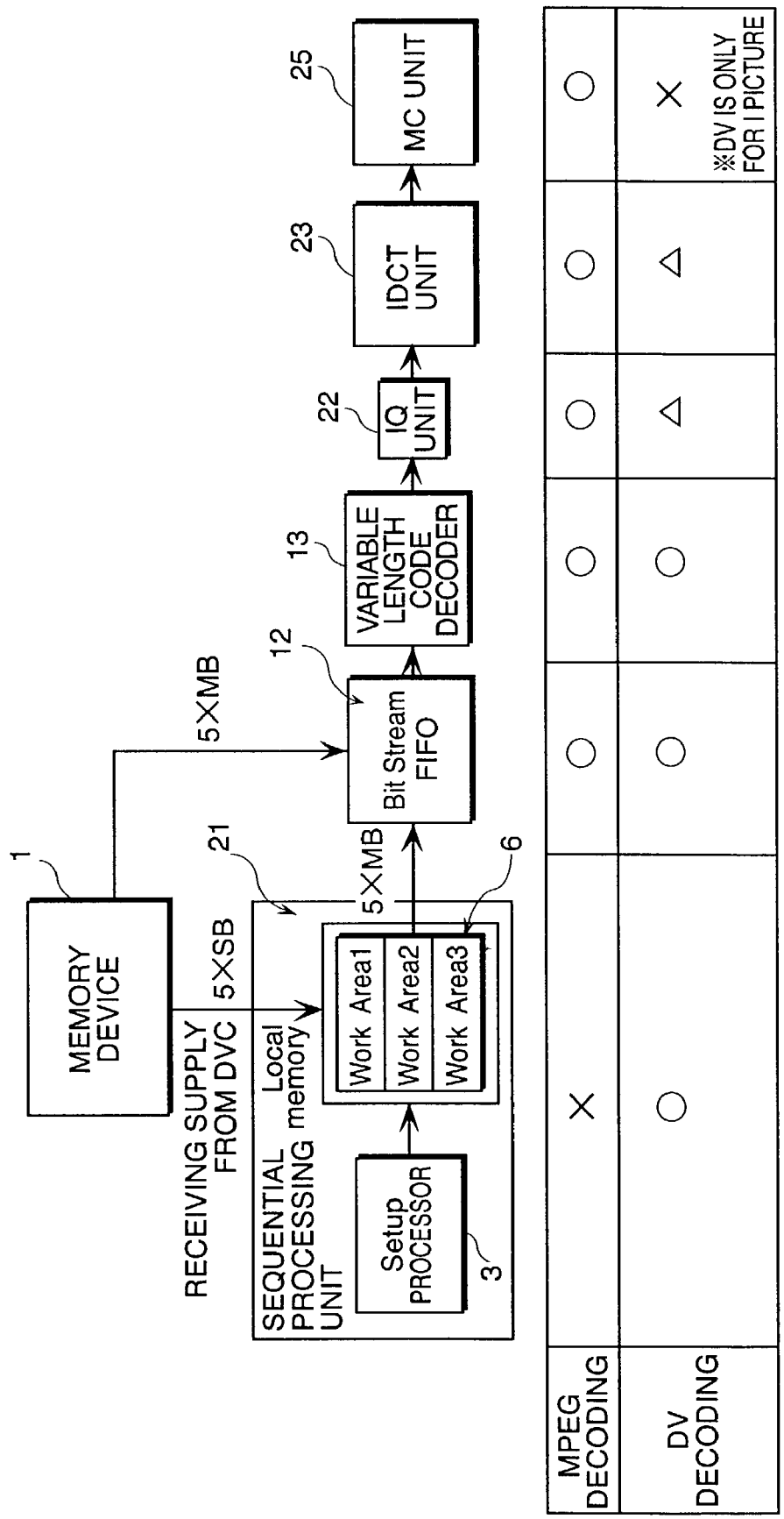
FIG. 19 is abstracts of decode-processing components, which relate to the decoding of moving image data.

FIG. 19 shows elements extracted from the DV·MPEG decoding apparatus, which are only constituting elements relating to the decoding of moving image data. The bottom table in FIG. 19 shows whether each of the constituting elements is unique to the function as an MPEG decoding apparatus or that as a DV decoding apparatus. As clear from FIG. 19, the BitStream FIFO 12 and the variable length code decoder 13 are common elements to the MPEG-decoding and DV-decoding, having ○ in the corresponding box in the table. The IQ unit 22 and the IDCT unit 23, having ○ for MPEG-decoding and Δ for DV-decoding, are partially common elements. The MC unit 25, having ○ for MPEG-decoding and X for DV-decoding, is an element which is dedicated to MPEG decoding, and the sequential processing unit 21, having X for MPEG-decoding and ○ for DV-decoding, is an element which is dedicated to DV-decoding.

Figure 20:
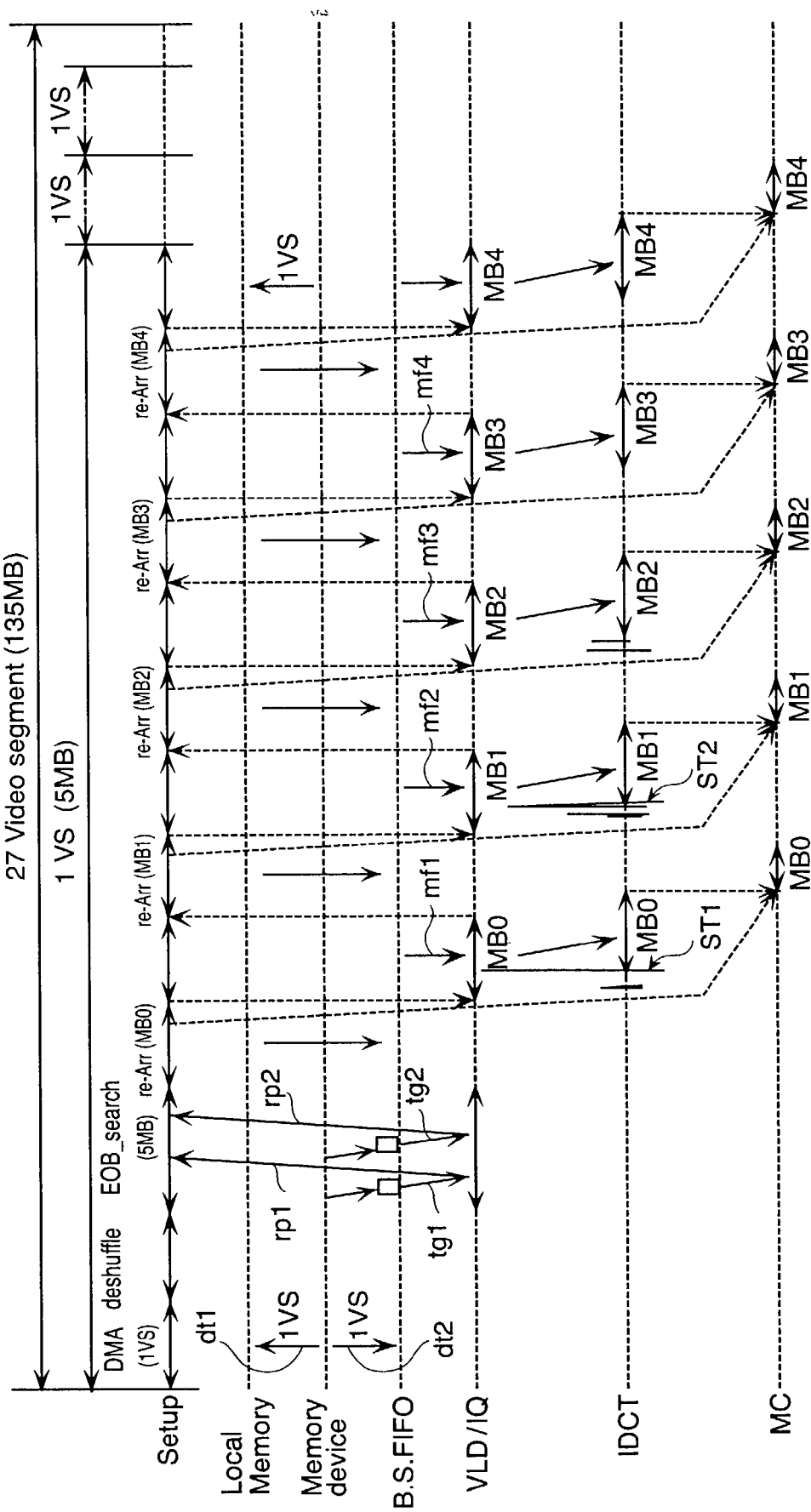
FIG. 20 is a timing chart for the DV·MPEG decoding apparatus relating to the second embodiment.
Figure 21:
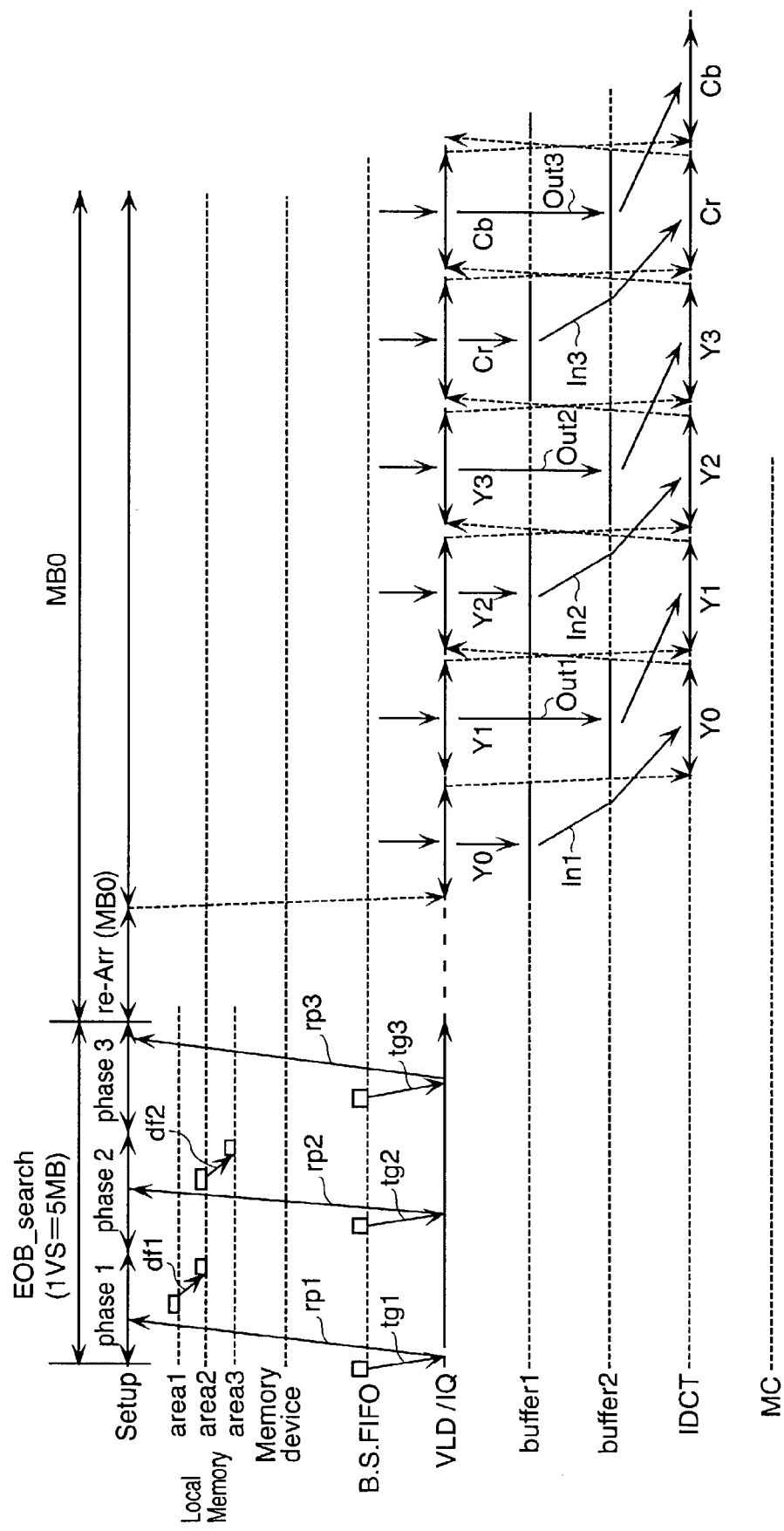
FIG. 21 is a timing chart detailing the processing of the Setup processor 3 for one MB.

As clear from FIG. 19, the local memory 6, the Setup processor 3, and the code ROM 4 are collectively installed as the sequential processing unit 21. The DV·MPEG decoding apparatus structured as such is described in the following with reference to the timing charts of FIG. 20 and FIG. 21. FIG. 20 is a timing chart showing how DV decoding is performed for one VS, and FIG. 21 is a timing chart showing how DV decoding is performed for one MB.

The sequential processing unit 21 converts SB into MB, the SB being that the memory controller 2 sequentially reads from the memory device 1. As shown in FIG. 19, when supplied moving image data from DV tape, the sequential processing unit 21 converts SB into MB before outputting the data to the BitStream FIFO 12. On the other hand, when supplied moving image data from a medium other than DV tape, the sequential processing unit 21 does not perform conversion from SB to MB. Whether conversion from SB to MB is performed or not is determined by an ID signal that is outputted from the input apparatus.

The code ROM 4 included in the sequential processing unit 21 performs the same processing as the first embodiment. The first row in FIG. 20 corresponds to the processing of the Setup processor 3. This row indicates that the Setup processor 3 first performs DMA transfer, deshuffling, and EOB_search, in this order, and then performs re-Arr processing for each MB, shown as re-Arr(MB0), re-Arr (MB1), re-Arr (MB2), re-Arr (MB3), and re-Arr (MB4). The second row corresponds to the processing of the local memory 6, the third row to the memory device, and the fourth to the BitStream FIFO 12, respectively. While the DMA transfer is performed, the transfer dt1 from the memory device 1 to the local memory 6, and the transfer dt2 from the memory device 1 to the BitStream FIFO 12 are performed. The VLD processing for MB0, MB1, MB2, MB3, and MB4 are performed after re-Arr for the corresponding MB has been completed. This means that VLD is performed after EOB_search being conducted for SB and then re-Arr being completed. FIG. 21 is a timing chart detailing the processing of the Setup processor 3 for one MB. In FIG. 21, EOB_search comprises of Phase 1, Phase 2, and Phase 3. In these phases, transfer tg1 and tg2 are performed for units from the BitStream FIFO 12 to the variable length code decoder 13, and responses rp1, rp2, and rp3 are outputted from the VLD to the Setup processor 3. Also in this figure, WorkArea 1, WorkArea 2, and WorkArea 3 are shown that are included in the local memory 6, and the transfer df1 of MR from the WorkArea 1 to the WorkArea 2, and the transfer df2 of VR from the WorkArea 2 to the WorkArea 3 are respectively shown.

The IQ unit 22 is a dedicated circuit performing inverse-quantization for MB that has undergone VLD in the variable length code decoder 13. The IQ unit 22 is common to MPEG decoding and DV decoding, except that the weighting factor unit 22a is added to be used for DV decoding. The factor weighting conducted at the weighting factor unit 22a is performed solely for the DCT block supplied from DV tape, and not performed for the DCT block supplied from a medium, other than DV tape. The timing in which the inverse-quantization is performed is shown in the fifth row of the timing chart of FIG. 20. In FIG. 20, the inverse-quantization by the IQ unit 22 is shown in the same row as the VLD by the variable length code decoder 13. The VLD by the variable length code decoder 13 is performed after data transfers, mf1, mf2, mf3, mf4 have been complete, from the BitStream FIFO 12 to the variable length code decoder 13. The inverse-quantization is performed in the same time period as the VLD, as clear from FIG. 20. This means that the IQ unit 22 performs inverse-quantization for each DCT factor that constitutes a DCT block, every time a DCT factor is outputted from the variable length code decoder 13.

The inverse discrete cosine transform (IDCT) unit 23 is a dedicated circuit for performing IDCT for MB that has undergone inverse-quantization in the IQ unit 22. The IDCT unit is common to MPEG decoding and DV decoding, except that the weighting factor unit 23a is added to be used for DV decoding. The factor weighting conducted at the weighting factor unit 23a is performed for DCT blocks outputted from the IQ unit 22, when the DCT blocks are read from DV tape. The sixth row in the timing chart of FIG. 20 shows a timing in which the IDCT is performed. The IDCT will start at the timing ST1, and ST2 without waiting for the completion of VLD/IQ which is shown in the one row above (in the fifth row).

The double buffer 24 performs input/output of the DCT blocks between the VLD/IQ and IDCT unit 23. The double buffer 24 has two buffers in order to store DCT blocks alternately that are outputted in the order of Y0, Y1, Y2, Y3, Cr, and Cb. The input/output of DCT blocks through the double buffer 24 is shown in FIG. 21. The double buffer 24 enables to perform the output of Y0, Y2, and Cr blocks from the VLD/IQ to the double buffer 24 (denoted by Out1, Out2, and Out 3 in FIG. 21), in parallel with the input of Y1, Y3, and Cb blocks from the double buffer 24 to the IDCT unit 23 (denoted by In1, In2, and In3).

The MC (Motion Compensation) unit 25 is a dedicated circuit for performing motion compensation for MB that has undergone IDCT in the IDCT unit 23, which is unique to MPEG decoding. The motion compensation is processing for providing MBs that constitute inter-frame coded picture data (i.e. P picture and B picture) with MB that constitute a referenced image. The resultant of the motion compensation will be written in the memory device 1. The MC unit 25 is not necessary in decoding moving image data recorded on DV tape, since the data on DV tape is intra-frame coded picture data, and not inter-frame coded picture data.

The, second embodiment of the present invention, as such, is based on the structure of a MPEG decoding apparatus, to which unique constituting element of the DV decoding apparatus is added. This structure enables to realize a function as DV·MPEG decoding apparatus by adding elements unique to a DV decoding apparatus.

Third Embodiment

Figure 22:
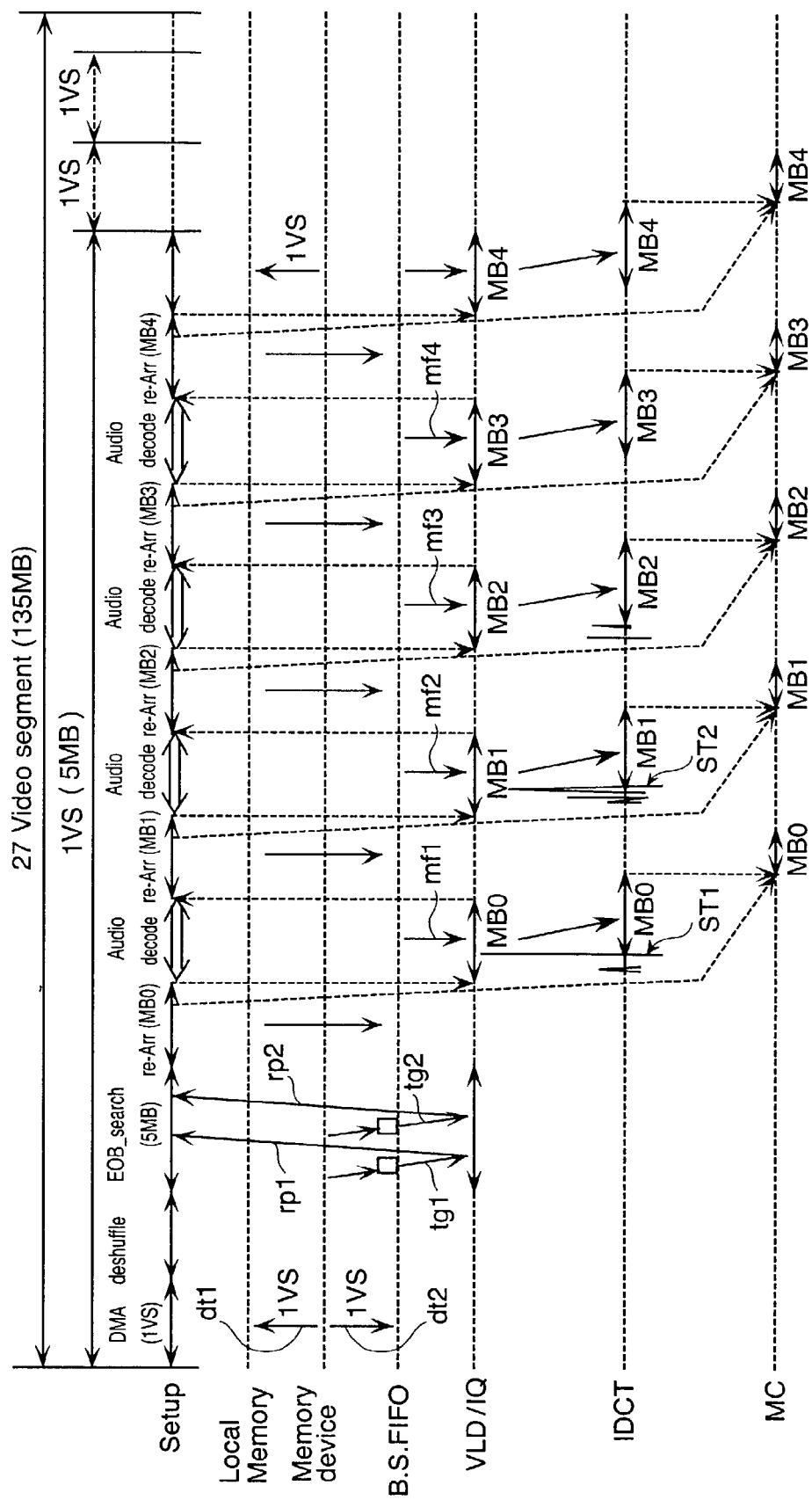
FIG. 22 is a timing chart for the DV·MPEG decoding apparatus relating to the second embodiment.

In the first to second embodiments as seen in the above, the Setup processor 3 performs only deshuffling, EOB_search, re-Arr that are unique to DV decoding apparatuses. In the third embodiment of the present invention, the processor 3 is enabled to perform other processing. FIG. 22 is a timing chart of the processing of the Setup processor 3 according to the third embodiment. In FIG. 20, the Setup processor 3 did not perform any processing after re-Arr for each MB is conducted. On the contrary, the Setup processor 3 of FIG. 22 is decoding audio data (shown by a white arrow in FIG. 22 denoted as "Audio decode"). This makes it unnecessary to add a dedicated circuit, to the image decoding apparatus, for decoding audio data stored together with moving image data in DV tape. Please note that in this embodiment it is also possible to make the Setup processor 3 to perform processing that is unique to the moving image data being compressed in accordance with the MPEG 2 standard, in case when moving image data has been supplied from other media than DV tape. Such processing includes MB header analysis for example, instead of the series of processing from deshuffling to re-Arr.

So far, the present invention has been described by way of examples for the current system under the present circumstances. Therefore the present invention may be implemented by changing or modifying the mentioned embodiments unless they are depart from the scope of the invention. A representative modification examples include (A), (B), (C), and (D) shown in the following.

(A) The format adopted by the units in SB are only one example, and can be other format.

(B) The procedure described in the embodiments (shown in the flow charts of FIG. 12, FIG. 14, FIG. 16) can be implemented by a program recorded on recording media, which may be distributed or sold. Such recording media include an IC card, an optical disc, a floppy disc, and the like. The program recorded on these recording media will be implemented by installing on a general purpose computer. Such general purpose computer sequentially executes the installed program, in order to realize the function as the image decoding apparatus shown by the present embodiments.

(C) The DV tape was used in the description in the embodiments. However, other media can be used in place of the DV tape, if such media adopt a method of storing variable length data in fixed-length fields.

(D) In the embodiments, image blocks are assumed to be DCT blocks. However, it is possible to use other units if they are used for decoding processing.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A decoding apparatus that converts a plurality of fixed-length data units to a plurality of variable-length data sets and decodes the plurality of variable-length data sets, the plurality of fixed-length data units constituting a synchronized block of digital tape, the decoding apparatus comprising:

a decoder that performs an end code judging processing of judging whether each fixed-length data unit includes an end code that indicates an end of a variable-length data set, and a variable-length data decoding processing of decoding the plurality of variable-length data sets;

a processor that performs the conversion and has the decoder perform the variable-length data decoding processing, wherein the conversion includes: an extraction processing of extracting a first variable-length data set, from a fixed-length data unit judged to include an end code at the end code judging processing and a reconstitution processing of combining a remainder of the fixed-length data unit with another fixed-length data unit which does not include an end code, in order to reconstitute a second variable-length data set;

an interface unit that connects the decoding apparatus with an external apparatus; and a detecting unit that detects whether data inputted from the external apparatus through the interface is either variable-length data or a synchronized block read from the digital tape, wherein when the detecting unit has detected the data being variable-length data, the processor does not perform the conversion, and the decoder decodes the variable-length data that has been inputted from the external apparatus, and when the detecting unit has detected the data being a synchronized block, the decoder performs the end code judging processing and the variable-length data decoding processing, and the processor performs the conversion.

2. The decoding apparatus of claim 1, wherein the decoder, for the fixed-length data unit that includes the end code, calculates an offset from a beginning of the fixed-length data unit to the end code, and a length of the first variable-length data set that the processor extracts by the extraction processing coincides with the offset.

3. The decoding apparatus of claim 1, wherein the digital tape stores a digital image, and each variable-length data set corresponds to one of a luminance block having m×m pixels, a red chrominance block having m×m pixels, and a blue chrominance block having m×m pixels, rn being a positive integer.

4. The decoding apparatus of claim 1, wherein the reconstitution processing is performed when the remainder includes an end code, and the conversion further includes a combining processing of, when the remainder does not include an end code, combining the remainder, another fixed-length data unit which does not include an end code, and a part of a fixed-length data unit that is included in another synchronized block, in order to reconstitute the second variable-length data set.

5. The decoding apparatus of claim 4, wherein the part of the fixed-length data unit included in the another synchronized block includes an end code.

6. The decoding apparatus of claim 5, wherein the fixed-length data unit that is included in another synchronized block includes three end codes, and a range of the part of the fixed-length unit used in the combining processing is from after the second end code up to the third end code.

7. The decoding apparatus of claim 5, wherein the processor further transmits the remainder to the decoder, the decoder further performs a remainder judging processing of judging whether the transmitted remainder includes an end code or not, and the combining processing is performed if the remainder is judged not to include an end code.

8. The decoding apparatus of claim 7, wherein when the remainder is judged to include an end code in the remainder judging processing, the decoder calculates an offset from a beginning of the remainder to the end code, and the processor removes a part that follows the offset within the remainder, and combines the offset with the another fixed-length data unit which does not include an end code.

9. A computer readable recording medium storing a computer executable by a computer that is equipped with a decoder, an interface that connects the decoder with an external apparatus, and a processor, that is characterized by making the processor convert a plurality of fixed-length data units into a plurality of variable-length data sets, and making the decoder decode the plurality of variable-length data sets, the plurality of fixed-length data units constituting a synchronized block of digital tape, the program comprising:

a first step of making the decoder perform an end code judging processing;

a second step of making the processor perform a conversion;

a third step of making the processor transmit the plurality of variable-length data sets to the decoder, thereby making the decoder perform a variable-length data decoding processing, wherein an end code judging processing judges whether each fixed-length data unit includes an end code that indicates an end of a variable-length data set, the variable-length data decoding processing decodes the plurality of variable-length data sets obtained by the conversion, and the conversion includes: an extraction processing of extracting a first variable-length data set, from a fixed-length data unit judged to include an end code by the end code judging processing; and a reconstitution processing of combining a remainder of the fixed-length data unit with another fixed-length data unit which does not include an end code, in order to reconstitute a second variable-length data set; and a fourth step of detecting whether data inputted from the external apparatus through the interface is either variable-length data or a synchronized block read from the digital tape, wherein 1) when the data has been detected to be variable-length data at the fourth step, the processor does not perform the conversion, and the decoder decodes the variable-length data that has been inputted from the external apparatus, and 2) when the data has been detected to be a synchronized block at the fourth step, the decoder performs the end code judging processing and the variable-length data decoding processing and the processor performs the conversion.

10. The computer readable recording medium of claim 9, wherein the decoder, for the fixed-length data unit that includes the end code, calculates an offset from a beginning of the fixed-length data unit to the end code, and a length of the first variable-length data set that the processor extracts by the extraction processing coincides with the offset.

11. The computer readable recording medium of claim 9, wherein the digital tape stores a digital image, and each variable-length data set corresponds to one of a luminance block having m×m pixels, a red chrominance block having m×m pixels, and a blue chrominance block having m×m pixels, m being a positive integer.

12. The computer readable recording medium of claim 9, wherein the reconstitution processing is performed when the remainder includes an end code, and the conversion further includes a combining processing of, when the remainder does not include an end code, combining the remainder, another fixed-length data unit which does not include an end code, and a part of a fixed-length data unit that is included in another synchronized block, in order to reconstitute the second variable-length data set.

13. The computer readable recording medium of claim 12, wherein the part of the fixed-length data unit included in the another synchronized block includes an end code.

14. The computer readable recording medium of claim 13, wherein the fixed-length data unit that is included in the another synchronized block includes three end codes, and a range of the part of the fixed-length unit used in the combining processing is from right after the second end code up to the third end code.

15. The computer readable recording medium of claim 13, wherein the processor further transmits the remainder to the decoder, the decoder further performs a remainder judging processing of judging whether the transmitted remainder includes an end code or not, and the combining processing is performed if the remainder is judged not to include an end coded.

16. The computer readable recording medium of claim 15, wherein when the remainder is judged to include an end code in the combining processing, the decoder calculates an offset from a beginning of the remainder to the end code, and the processor removes a part that follows the offset within the remainder, and combines the offset with the another fixed-length data unit which does not include an end code.

17. A decoding method used by a computer that is equipped with a decoder and a processor, the decoding method making the processor convert a plurality of fixed-length data units into a plurality of variable-Length data sets, and making the decoder decode the plurality of variable-length data sets, the plurality of fixed-length data units constituting a synchronized block of digital tape, the decoding method comprising:

a first step of making the decoder perform an end code judging processing;

a second step of making the processor perform a conversion;

a third step of making the processor transmit the plurality of variable-length data sets to the decoder, thereby making the decoder perform a variable-length data decoding processing, wherein an end code judging processing judges whether each fixed-length data unit includes an end code that indicates an end of a variable-length data set, the variable-length data decoding processing decodes the plurality of variable-length data sets obtained by the conversion, and the conversion includes: an extraction processing of extracting a first variable-length data set, from a fixed-length data unit judged to include an end code by the end code judging processing; and a reconstitution processing of combining a remainder of the fixed-length data unit with another fixed-length data unit which does not include an end code, in order to reconstitute a second variable-length data set; and a fourth step of detecting whether data inputted from the external apparatus through the interface is either variable-length data or a synchronized block read from the digital tape, wherein 1) when the data has been detected to be variable-length data at the fourth step, the processor does not perform the conversion, and the decoder decodes the variable-length data that has been inputted from the external apparatus, and 2) when the data has been detected to be a synchronized block at the fourth step, the decoder performs the end code judging processing and the variable-length data decoding processing and the processor performs the conversion.

* * * * *

UNITED STATES PATENT AND TRADEMARK OFFICE
CERTIFICATE OF CORRECTION

PATENT NO. : 7,228,064 B2
APPLICATION NO. : 10/211716
DATED : June 5, 2007
INVENTOR(S) : Wada et al.

It is certified that error appears in the above-identified patent and that said Letters Patent is hereby corrected as shown below:

In Claim 3, Column 13, line 43, "rn" should be --m--;
In Claim 9, Column 14, line 15, "computer executable" should be
--program executable--;
In Claim 17, Column 16, line 2, "variable-Length" should be --variable-length--;

Signed and Sealed this

Twenty-first Day of August, 2007

JON W. DUDAS
*Director of the United States Patent and Trademark Office*